United States Patent
Lecrone et al.

(10) Patent No.: US 8,959,305 B1
(45) Date of Patent: Feb. 17, 2015

(54) SPACE RECLAMATION WITH VIRTUALLY PROVISIONED DEVICES

(75) Inventors: Douglas E. Lecrone, Hopkinton, MA (US); Bruce Pocock, Titusville, FL (US); Paul A. Linstead, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 13/537,345

(22) Filed: Jun. 29, 2012

(51) Int. Cl.
*G06F 12/00* (2006.01)
*G06F 13/00* (2006.01)
*G06F 13/28* (2006.01)

(52) U.S. Cl.
USPC .......................... 711/166; 718/104; 707/813

(58) Field of Classification Search
CPC .................................................. G06F 12/0269
USPC .......................... 707/813; 711/166; 718/104
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,822,939 B1 | 10/2010 | Veprinsky et al. | |
| 7,949,637 B1 | 5/2011 | Burke | |
| 8,078,813 B2 | 12/2011 | LeCrone et al. | |
| 8,166,267 B2 * | 4/2012 | Sinclair et al. | 711/165 |
| 2002/0087822 A1 * | 7/2002 | Butterworth | 711/170 |
| 2006/0004951 A1 * | 1/2006 | Rudelic et al. | 711/103 |
| 2009/0070541 A1 * | 3/2009 | Yochai | 711/165 |
| 2009/0204749 A1 * | 8/2009 | Salessi et al. | 711/103 |

OTHER PUBLICATIONS

EMC Corporation, "Using Symmetrix Management Console to Manage EMC Symmetrix CKD Devices in a z/OS Enterprise Environment," White paper H5898, Nov. 2008, 36 pp.
U.S. Appl. No. 12/586,837, filed Sep. 29, 2009, LeCrone et al.
U.S. Appl. No. 12/592,988, filed Dec. 7, 2009, Martin et al.
U.S. Appl. No. 12/924,388, filed Sep. 27, 2010, Balcha et al.

* cited by examiner

*Primary Examiner* — Yong Choe
*Assistant Examiner* — Mark Giardino, Jr.
(74) *Attorney, Agent, or Firm* — Muirhead and Saturnelli, LLC

(57) ABSTRACT

A reclaim system provides for marking each track that is intended to be reclaimed in one or more storage devices and detecting and reclaiming such tracks. The reclaim system may include a feature and/or utility that may be used to mark, detect and return tracks to a free track pool of a virtual provisioning storage system in connection with the use of one or more thin Count Key Data (CKD) devices. Reclaim processing may include identifying tracks to be reclaimed, marking mark the tracks to be reclaimed, detecting tracks that have been marked to be reclaimed, and performing a reclaim task to return the marked and detected tracks to the free track pool, thereby reclaiming the tracks.

20 Claims, 17 Drawing Sheets

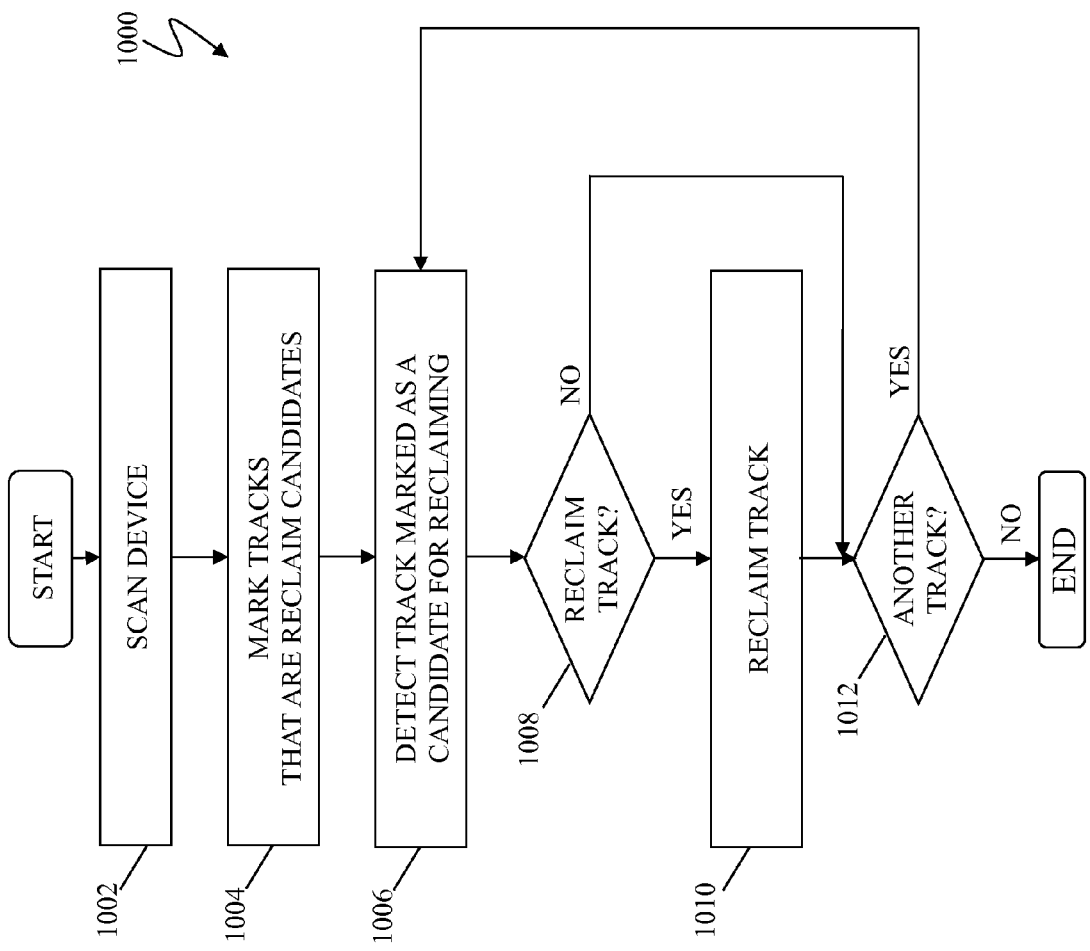

SPACE RECLAMATION WITH VIRTUALLY PROVISIONED DEVICES

TECHNICAL FIELD

This application relates to storage devices and, more particularly, to the field of data management of data stored on storage devices.

BACKGROUND OF THE INVENTION

Host processor systems may store and retrieve data (or datasets) using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Virtual provisioning (also referred to as thin provisioning) storage systems present a large amount of storage capacity to a host, but consume physical storage space only as needed from a shared pool. The devices of virtual provisioning may be known as thin devices or thin LUNs. With thin devices, the host visible capacity (e.g., storage perceived by the applications) is larger than the actual allocated space on the storage system. This simplifies the creation and allocation of storage capacity. Thin devices may be sized to accommodate growth without regard for currently available assets. Physical storage may be assigned to the server in a capacity-on-demand fashion from a shared pool.

Thin devices may be expanded as a file system runs, but may storage space may not be easily returned to the shared pool when no longer needed. Once allocated, in some cases, storage spaces may not be later recycled even if they are freed by the file system. A Symmetrix storage system product by EMC Corporation of Hopkinton, Mass. may be able to dynamically assigned tracks from a free track pool for thin device usage, but may not be able to detect when the track usage is no longer necessary and return the tracks to the free track pool. Known systems and techniques for space reclamation, such as the products by EMC Corporation, may include checking all the storage chunks allocated for a specified thin device and unmapping or otherwise freeing the allocated, but unneeded, storage chunks only if the storage chunks contain all zeroes. Space reclamation does not occur if any byte of a storage chunk is other than zero. Utilities, such as SDelete from Microsoft Corporation of Redmond, Wash., may be used to fill unused spaces of a volume with zeroes; however, such utilities may generate a large number of write I/Os that may have a disadvantageous impact on the system and other applications.

In particular, for Count Key Data (CKD) devices, there is no simple method available to return track space to a thin storage pool when no longer needed. CKD is a disk data architecture. In a CKD device, each physical disk record may include a count field, a key field (optional), and a user data field with error correction/detection information appended to each field. Because data records can be variable in length, in CKD, the count field indicates the user data record size. The key field enables a hardware search on a key. The commands used in the CKD architecture for managing the data and the storage devices are called channel command words. Reclaiming storage space that is no longer needed for a CKD device may not be easily accomplished with known techniques and systems. For example, when a dataset is initially allocated for a CKD device, an operating system, such as zOS by IBM Corporation, may assign track extents to the dataset. As writes occur to the dataset, the storage system, such as Symmetrix, may ensure that tracks are assigned on the back end. When the dataset is no longer needed, the zOS dataset is scratched, releasing the assigned extents. However, with known systems, there may be no notification to the storage system that the track extents being released may now be returned to the thin storage pool.

Accordingly, it would be desirable to provide a system that provides for efficient reclaiming of unused storage space in virtual (or thin) provisioning storage systems, and in particular, a storage system using CKD devices.

SUMMARY OF THE INVENTION

According to the system described herein, a method for performing reclaim processing of a storage system with virtually provisioned devices includes identifying at least one track corresponding to a virtually provisioned device of the storage system that is a candidate for reclaiming. The at least one track is marked as a marked track. The marked track is detected and the marked track is reclaimed to a free track pool of the storage system. Identifying the at least one track may include executing a session for one or more of the virtually provisioned devices that scans the one or more virtually provisioned devices and monitors changes in data on the one or more virtually provisioned devices. The session may maintain a map having at least one bit for each track of the one or more of the virtually provisioned devices that identifies the tracks as candidates for reclaiming. Marking the at least one track may include performing a track erase command on the at least one track that marks the track as erased. The marked track that is marked as erased may include a record zero written thereto. The reclaim processing may be scheduled using at least one utility. The scheduling may include automatically scheduling the performing of the reclaim processing as a background task. The virtually provisioned device may include a count key data device.

According further to the system described herein, a non-transitory computer readable medium storing software for performing reclaim processing of a storage system with virtually provisioned devices. The software includes executable code that identifies at least one track corresponding to a virtually provisioned device of the storage system that is a candidate for reclaiming. Executable code is provided that marks the at least one track, as a marked track. Executable code is provided that detects the marked track. Executable code is provided that reclaims the marked track to a free track pool of the storage system. The executable code that identifies the at least one track may include executable code that executes a session for one or more of the virtually provisioned devices and executable code that scans the one or more virtually provisioned devices and monitors changes in data on the one or more virtually provisioned devices. The executable code that executes the session may include executable code that maintains a map having at least one bit for each track of the one or more of the virtually provisioned devices that identifies the tracks as candidates for reclaiming. The executable code that marks the at least one track may include executable code that performs a track erase command on the at least one track that marks the track as erased. The marked track that is marked as erased may include a record zero written thereto. Executable code may be provided that schedules the reclaim processing using at least one utility. The scheduling may include automatically scheduling the performing of the reclaim processing as a background task. The virtually provisioned device may include a count key data device.

According further to the system described herein, a system for performing reclaim processing includes at least one virtually provisioned device of a storage system and at least utility that performs reclaim processing on the at least one virtually provisioned device. The at least one utility includes software stored on a non-transitory computer readable medium storing software. The software includes executable code that identifies at least one track corresponding to a virtually provisioned device of the storage system that is a candidate for reclaiming. Executable code is provided that marks the at least one track, as a marked track. Executable code is provided that detects the marked track. Executable code is provided that reclaims the marked track to a free track pool of the storage system. The executable code that identifies the at least one track may include executable code that executes a session for one or more of the virtually provisioned devices and executable code that scans the one or more virtually provisioned devices and monitors changes in data on the one or more virtually provisioned devices, and the executable code that executes the session maintains a map having at least one bit for each track of the one or more of the virtually provisioned devices that identifies the tracks as candidates for reclaiming. The executable code that marks the at least one track may include executable code that performs a track erase command on the at least one track that marks the track as erased. Executable code may be provided that schedules the reclaim processing using the at least one utility. The at least one virtually provisioned device may include a count key data device.

BRIEF DESCRIPTION OF THE DRAWINGS

Embodiments of the system are described with reference to the several figures of the drawings, which are briefly described as follows.

FIG. 17 is flow diagram showing reclaim processing according to an embodiment of the system described herein for marking, detecting and reclaiming tracks in a virtual provisioning system.

DETAILED DESCRIPTION OF VARIOUS EMBODIMENTS

Figure 1:
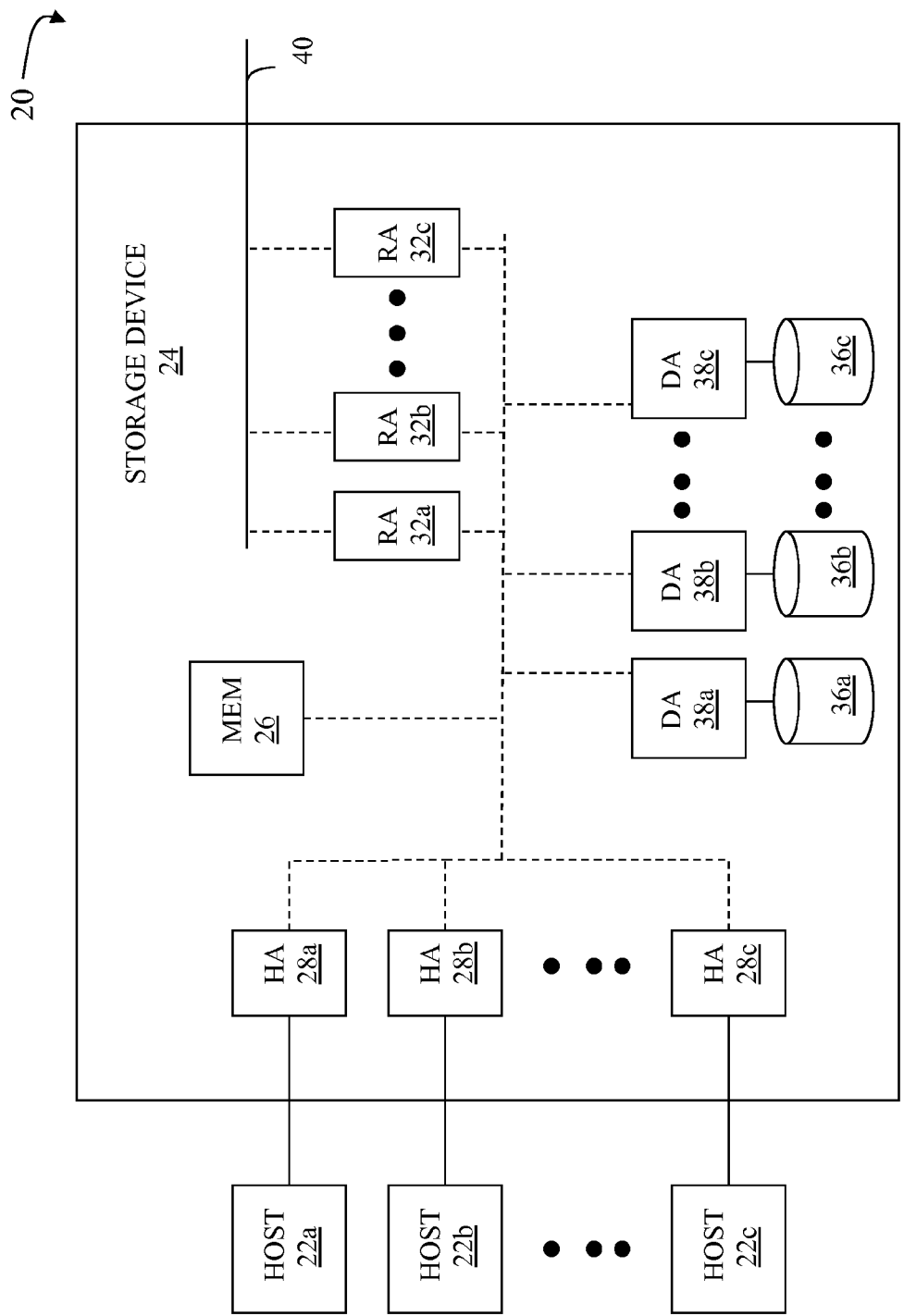
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device 24 also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. As further discussed elsewhere herein, the storage device 24 may include one or more CKD devices.

The storage device 24 may include one or more remote adapter units (RA's) 32a-32c. A remote adapter may be used in connection with an RDF product, such as produced by EMC Corporation of Hopkinton, Mass., that may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but may be used to transfer data between the storage device 24 and other storage devices (see FIG. 3 and corresponding description) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Pat. No. 8,078,813 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage and executed by one or more processors, and a network on which the system may be implemented may include any suitable network, including an intranet or the Internet.

Figure 2:
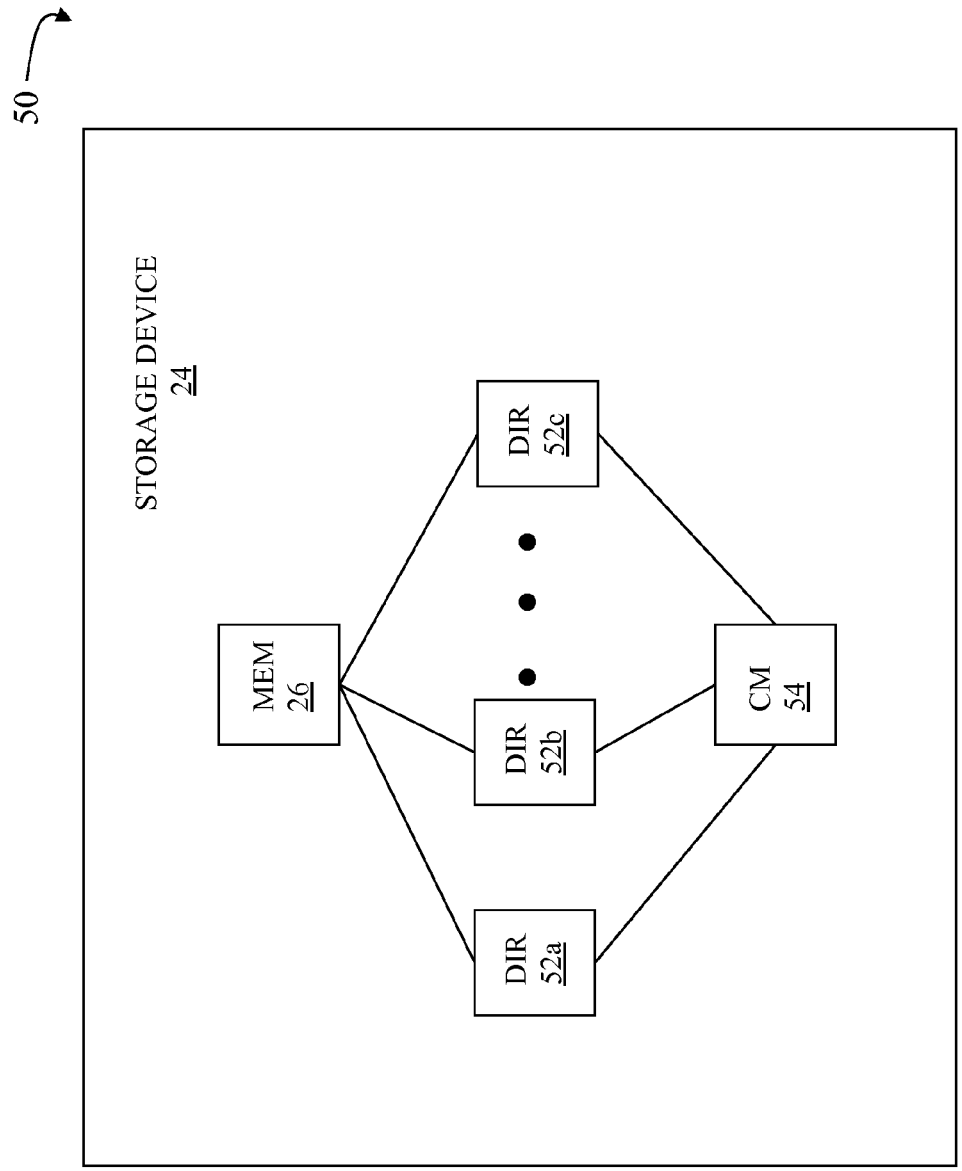
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
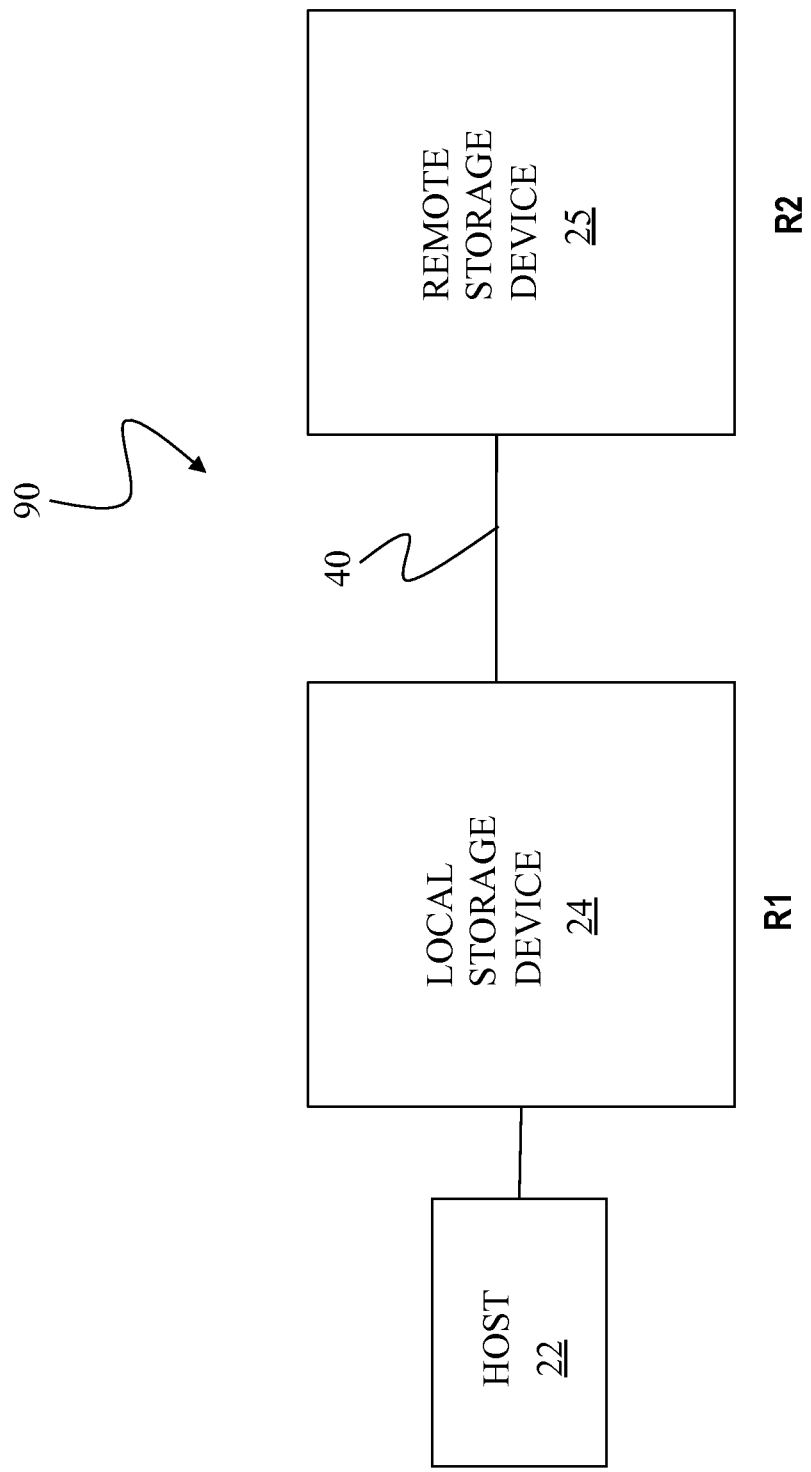
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the RDF link 40. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the RDF link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein In an embodiment, the system described herein may be used in connection with SRDF synchronous (SRDF/S) transfers. For an SRDF/S transfer, data written from one of the hosts 22a-22c to the local storage device 24 may be stored locally, for example on one of the data volumes 36a-36c of the local storage device 24 while being transferred from the local storage device 24 to the remote storage device 25. Receipt by the remote storage device 25 is then acknowledged to the local storage device 24 which then provides an acknowledge of the initial write back to the appropriate one of the hosts 22a-22c. In other embodiments, the system described herein may also be used in connection with, or in combination with, other modes of data transfer including, for example, asynchronous (SRDF/A) transfers in which data transfers to the remote devices are performed asynchronously with the writes to the local devices.

Figure 4:
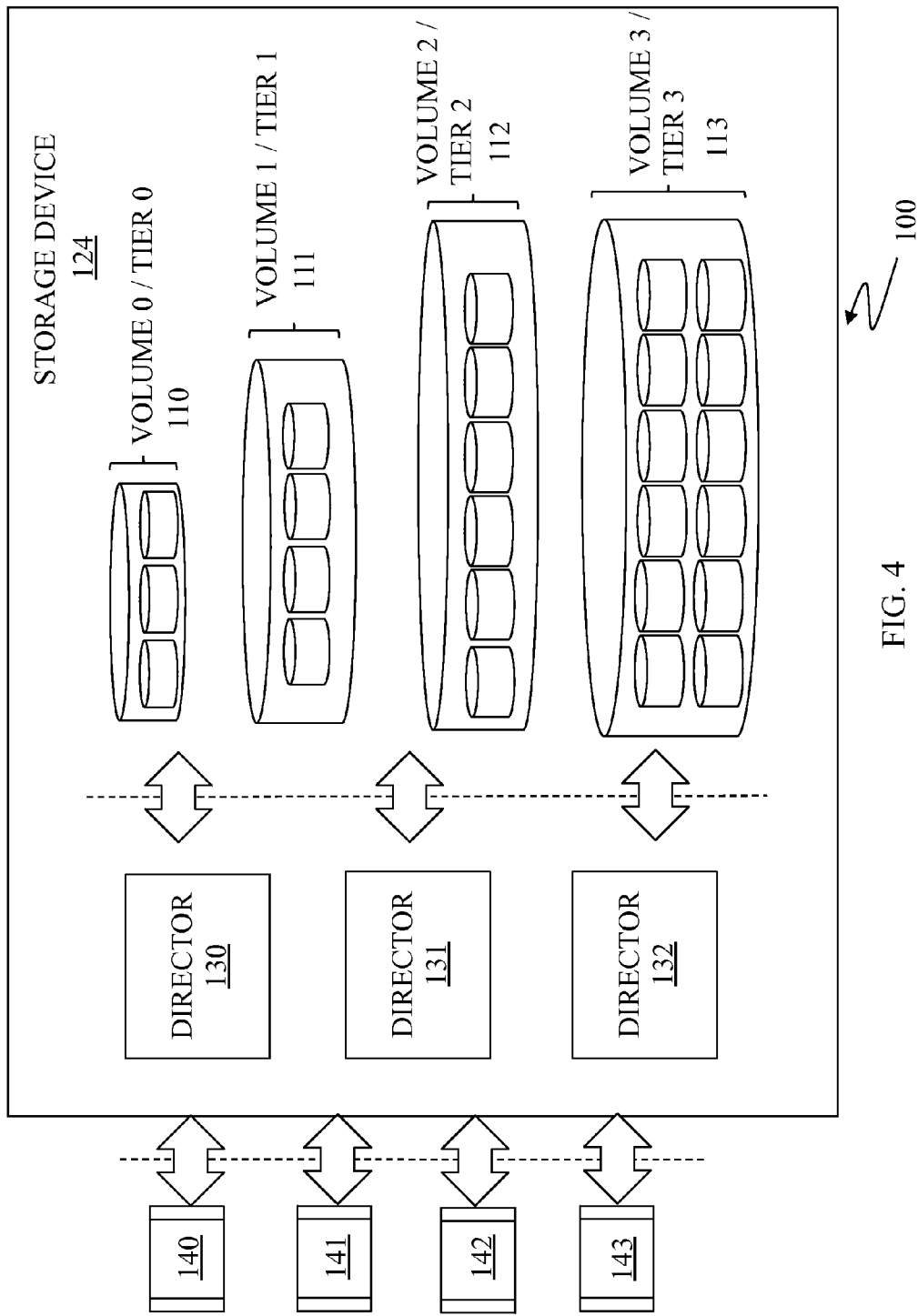
FIG. 4 is a schematic illustration showing a storage system according to an embodiment of the system described herein.

FIG. 4 is a schematic illustration showing a storage system 100 according to an embodiment of the system described herein. The storage system 100 may include a storage device 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage device 124 that are facilitated using one or more of the directors 130-132. The storage device 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Various techniques concerning the management of data between volumes on multiple storage tiers and/or between multiple storage tiers within a single volume, including the use of virtual (thin) provisioning technology, are discussed, for example, in: U.S. Patent App. Pub. No. 2009/0070541 to Yochai et al., entitled "Automated Information Life-Cycle Management With Thin Provisioning;" U.S. Pat. No. 7,949,637, entitled "Storage Management For Fine Grained Tiered Storage With Thin Provisioning;" U.S. Pat. No. 7,822,939 to Veprinsky et al., entitled "Data De-Duplication Using Thin Provisioning;" U.S. Ser. No. 12/586, 837 to LeCrone et al., filed Sep. 29, 2009, entitled "Sub-Tiering Data At The Volume Level;" and U.S. Ser. No. 12/592,988 to Martin et al., filed Dec. 7, 2009, entitled "Normalizing Capacity Utilization Within Virtual Storage Pools."

According to various embodiments, each of the volumes 110-113 may be located in different storage tiers. Tiered storage provides that data may be initially allocated to a particular fast volume/tier, but a portion of the data that has not been used over a period of time may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Figure 5:
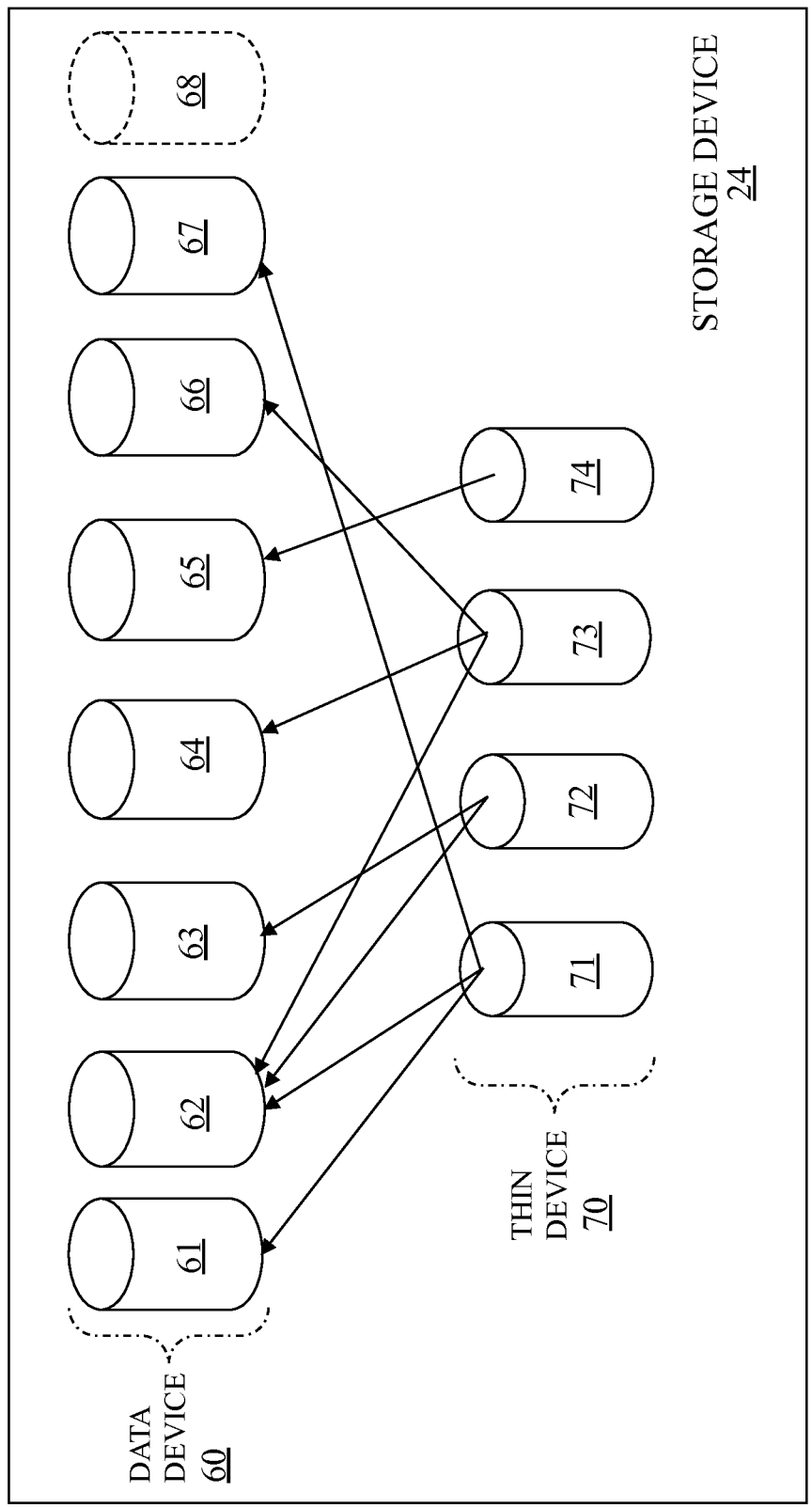
FIG. 5 is a schematic diagram showing the storage device as including one or more data devices and one or more thin devices according to an embodiment of the system described herein.

FIG. 5 is a schematic diagram showing the storage device 24 as including a plurality of data devices 61-68 and a plurality of thin devices 71-74 that may be used in connection with the system described herein. Alternatively, in other embodiments that may be used in connection with the system described herein, instead of being separate devices, the data devices 61-68 may be sections of one data device 60 and, similarly, the thin devices 71-74 may be sections of one thin device 70. Further, the thin devices 71-74, and/or sections of the thin device 70, may be incorporated into the storage device 24 and/or may be stored and accessed externally to the storage device 24. The data devices 61-68 may be implemented as a logical device like standard logical devices provided in a Symmetrix data storage device produced by EMC Corporation. The data device section 68 is illustrated with broken lines to indicate that the data device section 68 does not yet exist but may be created, as further discussed elsewhere herein. In some embodiments, the data device sections 61-67 may not be directly useable (visible) to hosts coupled to the storage device 24. Each of the data devices sections 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices sections 61-67 may be designated as corresponding to different classes, so that different ones of the data devices 61-67 correspond to different physical storage having different relative access speeds or RAID (redundant array of independent disks) protection type or some other relevant distinguishing characteristic or combination of characteristics.

The thin devices 71-74 may appear to a host coupled to the storage device 24 as a logical volume (logical device) containing a contiguous block of data storage. Each of the thin devices 71-74 may contain pointers to some or all of the data devices 61-67 (or portions thereof), as further discussed elsewhere herein. As illustrated, in some embodiments, only one thin device may be associated with a data device while, in other embodiments, multiple thin devices may be associated with the same data devices. In some instances, an implementation according to the system described herein may allow for hybrid logical devices where a single logical volume has portions that behave as a data device and/or portions that behave as a thin device.

A thin device presents a logical storage space to one or more applications running on a host where different portions of the logical storage space may or may not have corresponding allocated physical storage space associated therewith. However, the thin device may not be mapped directly to physical storage space. Instead, for example, portions of the thin storage device for which physical storage space exists may be mapped to one or more data devices, which are logical devices that map logical storage space of the data device to physical storage space on the disk drives 36a-36c. As further discussed elsewhere herein, an access of the logical storage space of the thin device may result in either a null pointer (or equivalent) indicating that no corresponding physical storage space has yet been allocated, or results in a reference to a data device (or section thereof) which in turn references the underlying physical storage space.

Figure 6:
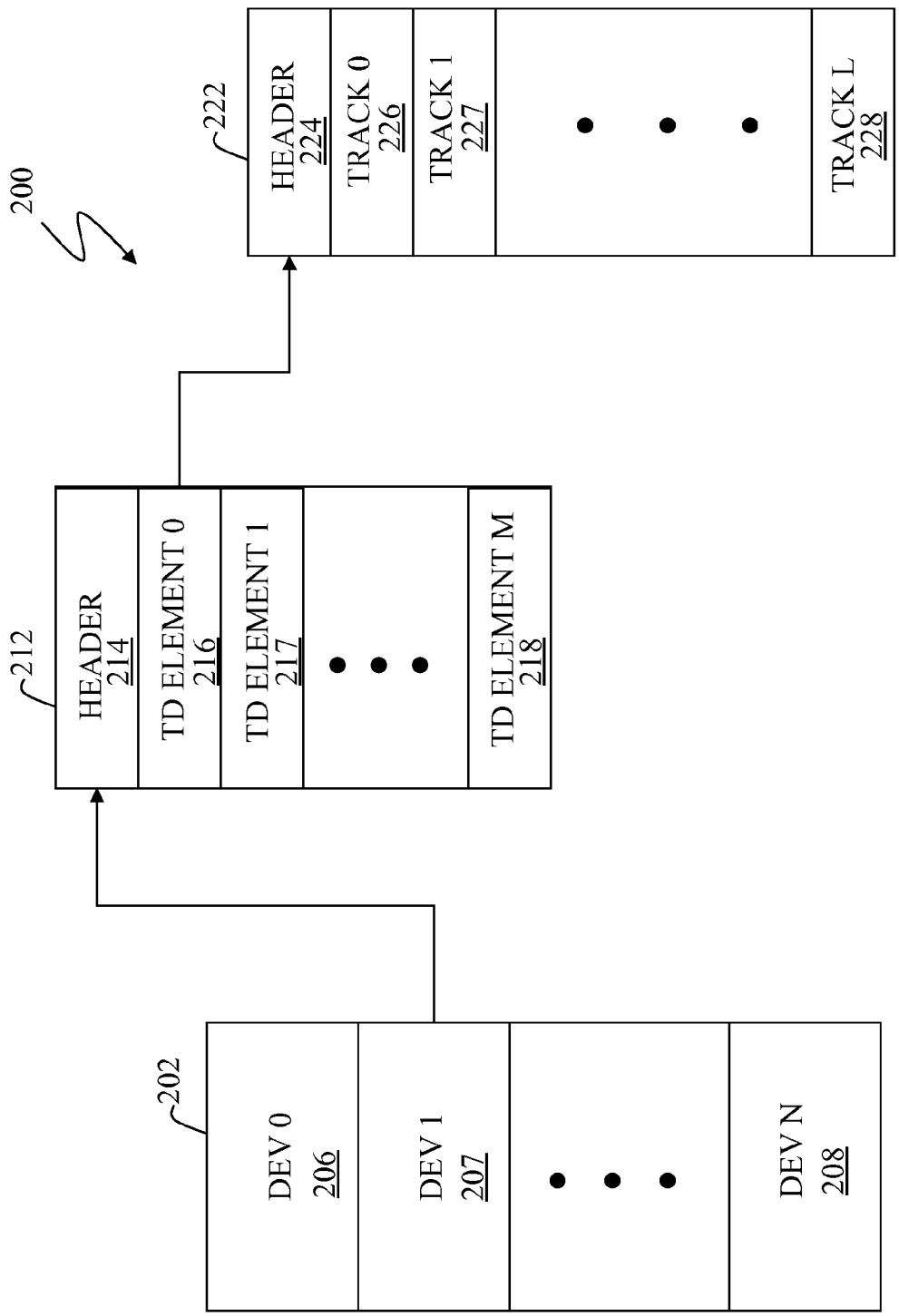
FIG. 6 is a schematic diagram illustrating tables that are used to keep track of device information according to an embodiment of the system described herein.

FIG. 6 is a diagram 200 illustrating tables that are used to keep track of device information according to an embodiment of the system described herein. A first table 202 corresponds to all of the devices used by a storage device or by an element of a storage device, such as an HA and/or a DA. The table 202 includes a plurality of logical device (logical volume) entries 206-208 that correspond to all the logical devices used by the storage device (or portion of the storage device). The entries in the table 202 may include information for thin devices, for data devices, for standard logical devices, for virtual devices, for business continuance volume (BCV) devices, and/or any or all other types of logical devices used in connection with the system described herein.

Each of the entries 206-208 of the table 202 correspond to another table that may contain information for one or more sections of a logical volume, such as a thin device logical volume. For example, the entry 207 may correspond to a thin device table 212. The thin device table 212 may include a header 214 that contains overhead information, such as information identifying the corresponding thin device, information concerning the last used data device and/or other information including counter information, such as a counter that keeps track of used group entries (described below). The header information, or portions thereof, may be available globally to the storage device 24. The thin device table 212 may include one or more group elements 216-218, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 216-218 (for example, the group element 216) of the thin device table 212 may identify a particular one of the data devices 61-67 having a track table 222 that contains further information, such as a header 224 having overhead information and a plurality of entries 226-228 corresponding to each of the tracks of the particular one of the data device sections 61-67. The information in each of the entries 226-228 may include a pointer (either direct or indirect) to the physical address on one of the disk drives 36a-36c of the storage device 24 (or a remote storage device 25 if the system is so configured) that maps to the logical address(es) of the particular one of the data devices 61-67. Thus, the track table 222 may be used in connection with mapping logical addresses of the logical device sections corresponding to the tables 202, 212, 222 to physical addresses on the disk drives 36a-36c of the storage device 24.

The tables 202, 212, 222 may be stored in the global memory 26 of the storage device 24. In addition, the tables corresponding to particular logical device sections accessed by a particular host may be stored (cached) in local memory of the corresponding one of the HA's 28a-28c. In addition, the RA's 32a-32c and/or the DA's 38a-38c may also use and locally store (cache) portions of the tables 202, 212, 222.

Figure 7:
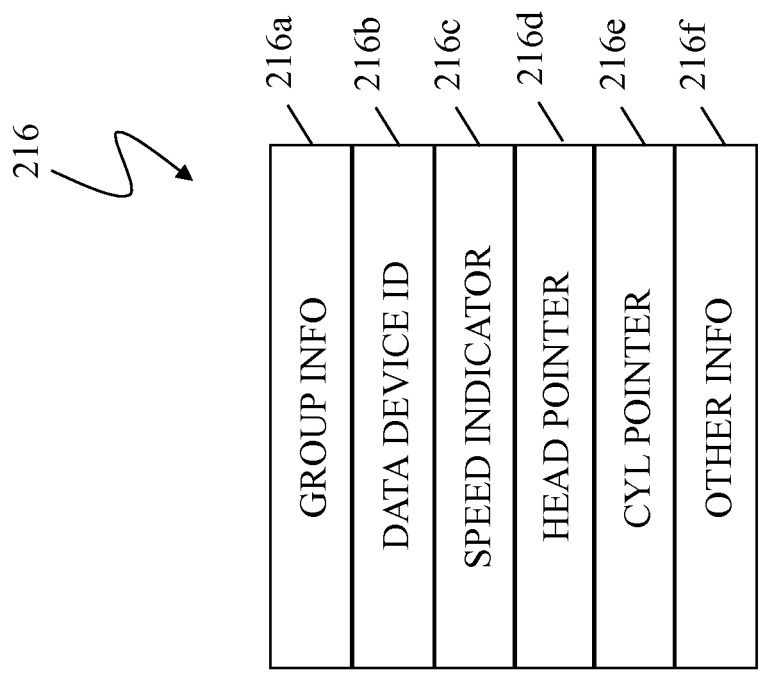
FIG. 7 is a schematic diagram illustrating a group element of the thin device table in connection with an embodiment of the system described herein.

FIG. 7 is a schematic diagram illustrating a group element 216 of the thin device table 212 in connection with an embodiment of the system described herein. The group element 216 may includes a plurality of entries 216a-216f. The entry 216a may provide group information, such as a group type that indicates whether there has been physical address space allocated for the group. The entry 216b may include information identifying one (or more) of the data devices 61-67 that correspond to the group (i.e., the one of the data devices 61-67 that contain pointers for physical data for the group). The entry 216c may include other identifying information for the one of the data devices 61-67, including a speed indicator that identifies, for example, if the data device is associated with a relatively fast access physical storage (disk drive) or a relatively slow access physical storage (disk drive). Other types of designations of data device sections are possible (e.g., relatively expensive or inexpensive, RAID protection type, number of mirrored copies, etc.). The entry 216d may be a pointer to a head of the first allocated track for the one of the data devices 61-67 indicated by the ID entry 216b. Alternatively, the entry 216d may point to header information of the data device track table 222 immediately prior to the first allocated track. The entry 216e may identify a cylinder of a first allocated track for the one the data devices 61-67 indicated by the ID entry 216b. The entry 216f may contain other information corresponding to the group element 216 and/or the corresponding thin device. In other embodiments, entries of the group table 216 may identify a range of cylinders of the thin device and a corresponding mapping to map cylinder/track identifiers for the thin device to tracks/cylinders of a corresponding data device. In an embodiment, the size of the group element 216 may be eight bytes.

Figure 8:
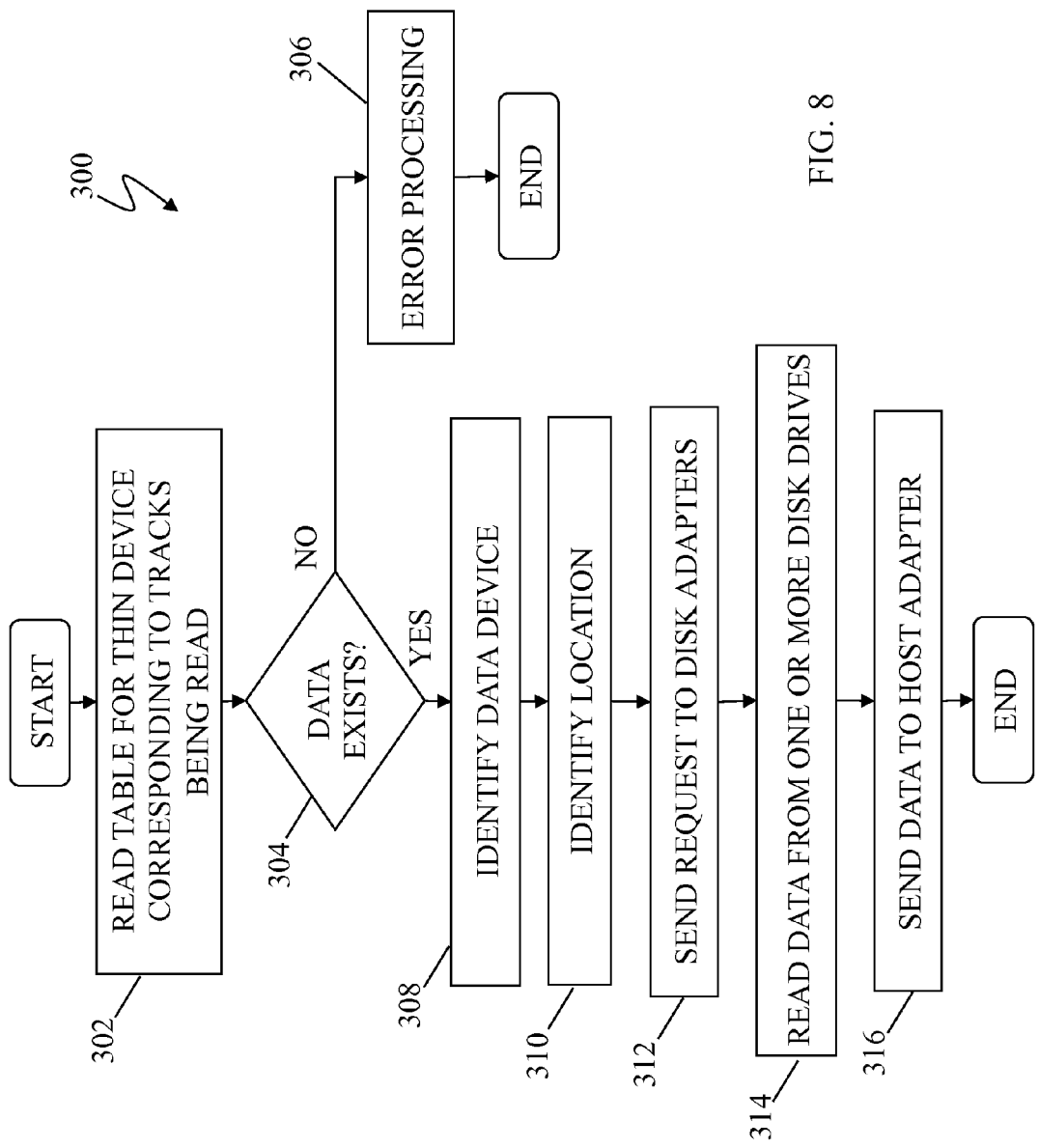
FIG. 8 is a flow diagram illustrating processing for handling a read of one or more logical tracks of one of the thin devices according to an embodiment of the system described herein.

FIG. 8 is a flow diagram 300 illustrating processing for handling a read of one or more logical tracks of one of the thin devices 71-74 in an embodiment of the system described herein. In a step 302, an appropriate one of the host adapters 28a-28c reads the group table 212 of the one of the thin devices 71-74 corresponding to the logical tracks being read. After the step 302, at a test step 304, it is determined whether the logical tracks identified from the group table 212 corresponds to any of the data devices 61-67 (i.e., if there is physical data corresponding to the logical tracks being read). If there is no corresponding physical data (meaning that no logical track(s) were ever written), then processing proceeds to a step 306 where error processing is performed, such as returning a NULL value to the host. Other appropriate error processing may be performed at the step 306. After the step 306, processing is complete.

If it is determined at the step 304 that there is physical data corresponding to the logical tracks being read, then processing proceeds to a step 308 where one or more of the data devices 61-67 associated with the logical tracks being read are identified from the group table 212. After the step 308, processing proceeds to a step 310 where the track table 222 is read from the identified one or more of the data devices 61-67 and the corresponding location of the physical data (i.e., physical cylinder and track) is determined. Logical storage space maps to physical storage space of the physical devices. After the step 310, processing proceeds to a step 312 where a request may be sent to one or more disk adapters 38a-38c corresponding to disk drives 36a-36c that provide the physical storage space associated with the identified one of the data devices 61-67 and corresponding location information. After the step 312, processing proceeds to a step 314 where the physical data is read. Note that the data may be stored in a cache or other memory (for example, the memory 26) in connection with being read. In some cases, if the data being read is already in the cache, then the processing at the step 812 and following steps may not be necessary. Note also that reading the data may include updating any metadata used to provide the processing described herein, such as the time last accessed, the host/user making the request, frequency of use, and/or any other appropriate metric. After the step 314, processing proceeds to a step 316 where the data may be received by an appropriate one of the host adapters 28a-28c (e.g., by reading the memory 26). After the step 316, processing is complete.

Figure 9:
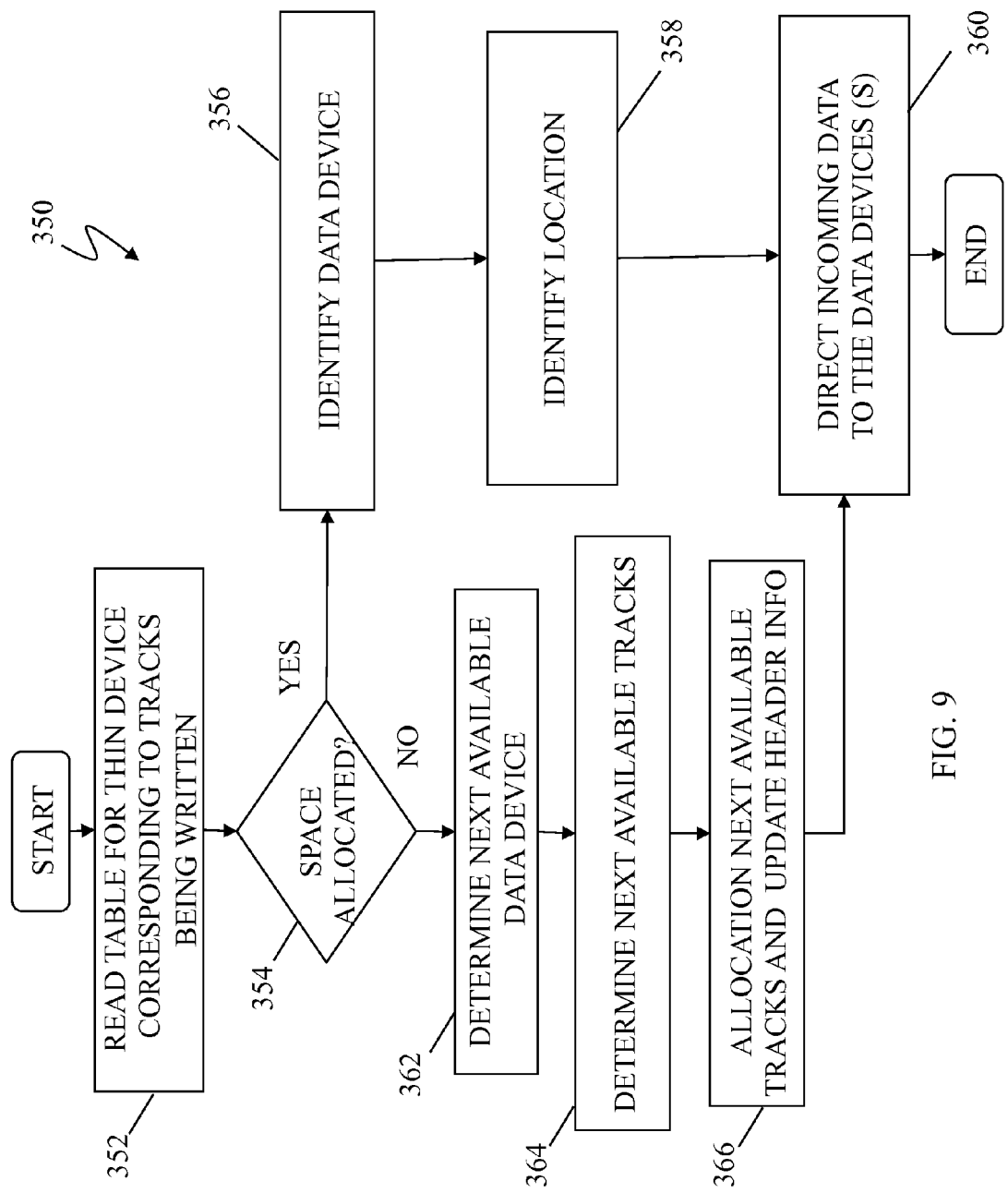
FIG. 9 is a flow diagram illustrating processing for handling a write of logical track(s) to one or more of the thin devices in connection with the system described herein.

FIG. 9 is a flow diagram 350 illustrating processing for handling a write of logical track(s) to one or more of the thin device(s) 71-74 in connection with the system described herein. At a step 352, an appropriate one of the host adapters 28a-28c reads the group table 212 of the one or more of the thin devices 71-74 corresponding to the logical tracks being written.

Following the step 352 is a test step 354 where it is determined whether physical space had been previously allocated (i.e., in a prior write operation) for the tracks being written. If so, then processing proceeds to a step 356 where the data device that includes the tracks is identified. After the step 356, is a step 358 where the track table 222 is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to a logical storage space of the data devices. Following the step 358 processing proceeds to a step 360 where the data being written is directed to the appropriate physical storage space. As further discussed elsewhere herein, data may be written among multiple devices in a striping process in which data is advantageously striped across the multiple devices. After the step 360, processing is complete.

If it is determined at the step 354 that there is no physical storage that has been allocated for the logical track(s) being written, then control transfers to a step 362, where a next available data device identifier (i.e., the data device 68) is determined. This information may be obtained from the header 214 of the device table 212.

After the step 362, processing proceeds to a step 364 where available physical storage space on the disk drives 36a-36c is determined. In an embodiment herein, available physical storage space is allocated sequentially from one or more of the disk drives 36a-36c. Following the step 364 is a step 366 where a request may be sent to a disk adapter 38a-38c (or possibly the RA's 32a-32c) to allocate the physical storage space for the write. Also at the step 366, header info is updated to reflect the newly allocated data device and physical tracks. After the step 366, processing proceeds to the step 360, discussed above, where the data being written is directed to the one or more data device sections. After the step 360, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 212 (for example, the entry 216f of the group element 216). Alternatively, the data characteristic information may be stored in a memory, such as the global memory 26 of the storage device 24, and a pointer to this information stored in the group element 216. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be made available for a thin storage device even though the corresponding physical storage space had not yet been allocated. In an alternative embodiment, the policy for the thin device may be to report something less than the total maximum that could be allocated. In some embodiments, used (unavailable) physical storage space may not exceed a predetermined level, e.g. 30%, of the thinly-provisioned storage capacity that appears available to the user.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The thin devices 71-74 may appear to a host coupled to the storage device 24 (and/or, e.g., the storage device 124) as a logical volume (logical device) containing a contiguous block of data storage, as discussed herein. Each of the thin devices 71-74 may correspond to a particular data device, a portion thereof and/or multiple data devices. Accordingly, each of the thin devices 71-74 may map to storage areas across multiple storage volumes. As a result, although each of the thin devices 71-74 may appear as containing a logically contiguous block of storage, each of the thin devices 71-74 may allow for blocks of data to be transparently stored (and/or retrieved) from discontiguous storage pools made up of the varying classes of storage. In this way, the granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the thin device 70 may be a metavolume of concatenated thin volumes/devices, as further discussed elsewhere herein.

Figure 10:
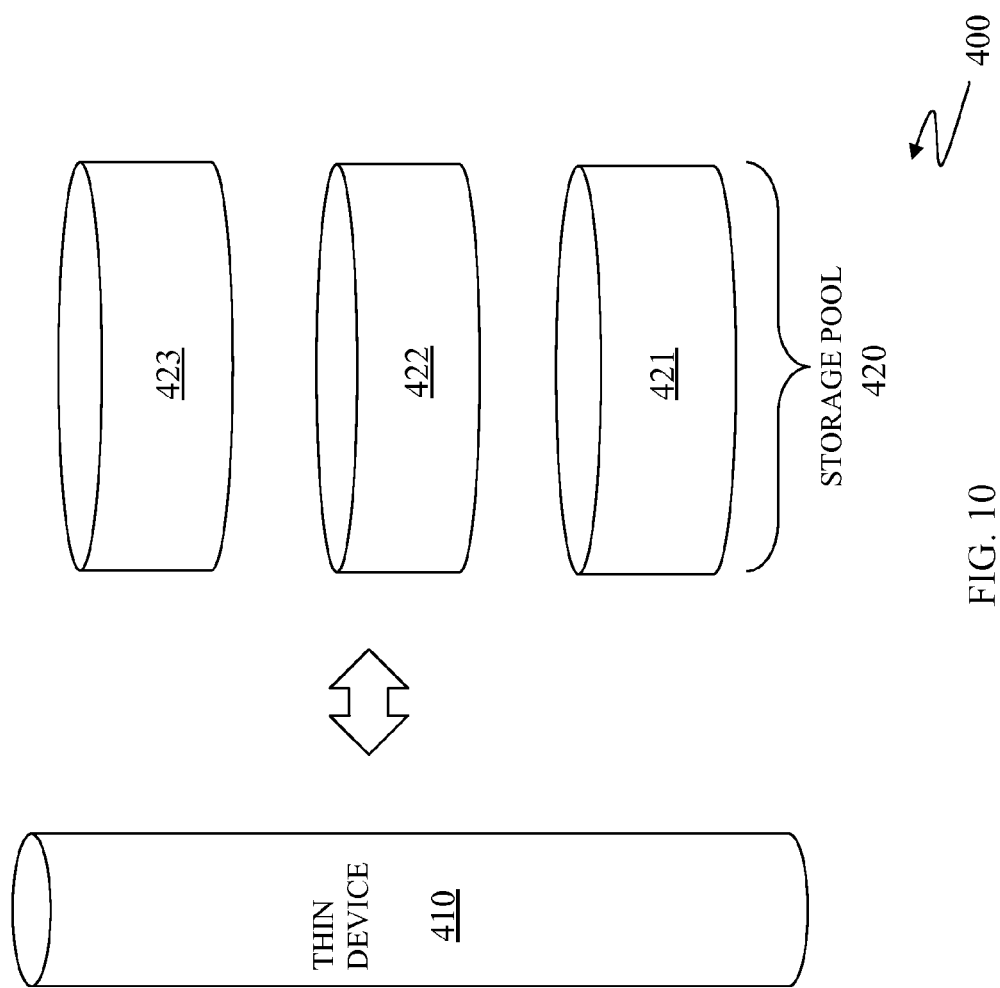
FIG. 10 is a schematic illustration of a storage system including virtual provisioning features according to an embodiment of the system described herein.

FIG. 10 is a schematic illustration of a storage system 400 including virtual provisioning features according to an embodiment of the system described herein. A thin device 410, that may be like the thin devices 71-74 discussed elsewhere herein, is shown coupled to multiple storage volumes 421-423 forming a storage pool 420 accessible to the thin device 410. As discussed elsewhere herein, each of the volumes 421-423 may include one or more data devices, like the data devices 61-68 discussed elsewhere herein, that map to physical storage areas. The volumes 421-423 may be part of one or more storage devices like that further discussed elsewhere herein.

The thin device 410 may map to the different storage volumes 421-423 although, as noted above, the mapping may not be a direct mapping to physical storage space. A particular thin device may indicate a maximum amount of physical storage space that could be allocated for the thin device (thin-provisioned storage space) even though the corresponding physical storage space has not yet been allocated. As discussed herein, the granularity of the system described herein may be less than at the file level and allow for blocks of data of any size to be stored across multiple storage volumes 421-423 in a process that is transparent to the host and/or host application.

Figure 11:
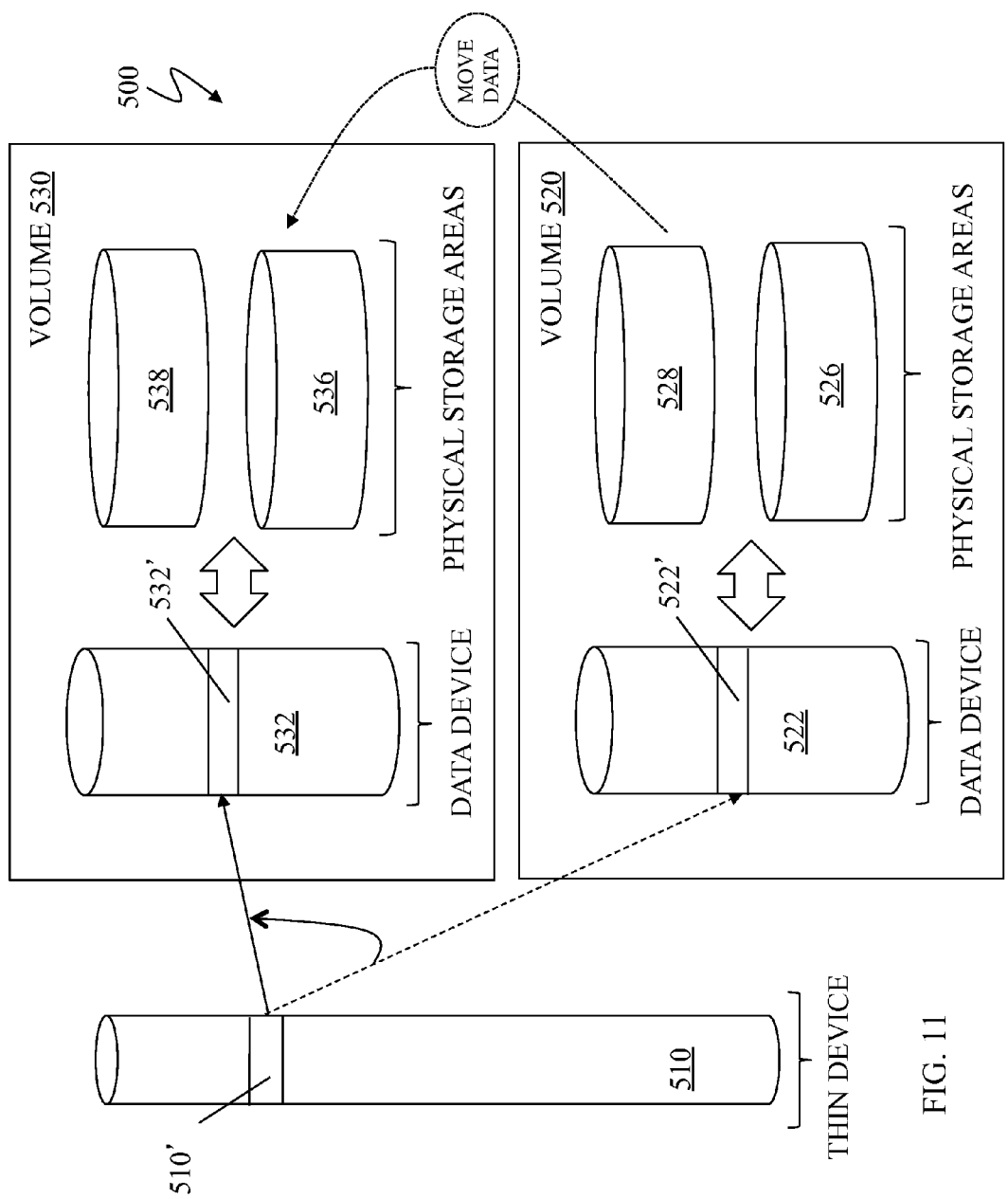
FIG. 11 is a schematic illustration showing a storage device in connection with movement of data using virtual provisioning according to an embodiment of the system described herein.

FIG. 11 is a schematic illustration showing an embodiment of a storage system 500 described in connection with movement of data from one storage area to a different storage area involving virtual provisioning features according to an embodiment of the system described herein. The storage system 500 may include a thin device 510 and one or more volumes 520, 530. Each of the volumes 520, 530 may include a data device 522, 532 associated with respective physical storage areas 526, 528, 536, 538. Note that, in various embodiments, the thin device 510 may be incorporated into one or more of the volumes 520, 530 and/or be a device that is stored and/or accessed separately therefrom.

According to an embodiment of the system described herein, a portion 510' of the thin device 510 may point to a portion 522' of the data device 522 in connection with a mapping of data stored on the storage volume 520 to one of the physical storage areas 526, 528 of the volume 520. In an embodiment, in connection with moving data from the volume 520 to the volume 530, the pointer from the thin device portion 510' may be modified to point to a new portion 532' of a data device 532 that maps to the new location of the data on the physical storage areas 536, 538 of the volume 530. Data may be moved among volumes of one or more storage pools to normalize utilization of the storage volumes for purposes of appropriately striping data across volumes of the storage pool following the addition of new (empty) volumes to a storage system. It is also noted that in various embodiments, the system described herein may also be appropriately used in connection with "sparse cloning" that allows for more than one thin device to point to a data device as way of providing an efficient cloning mechanism. In this way, cloning operations may be almost instantaneous, involving just the setting of pointers, and initially consume little or no additional physical storage space.

Figure 12:
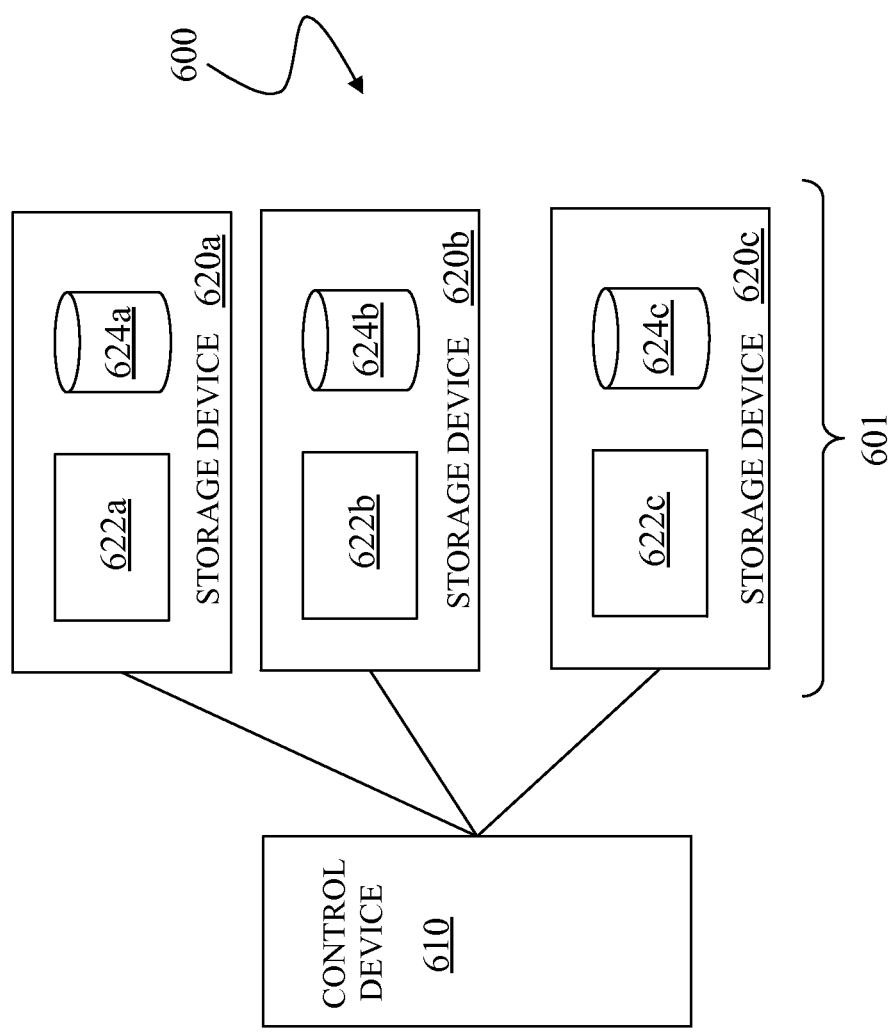
FIG. 12 is a schematic illustration of a storage system that may be used in connection with an embodiment of the system described herein.

FIG. 12 is a schematic illustration of a storage system 600 that may be used in connection with an embodiment of the system described herein. For example, the storage system 600 may be a RAID system. The storage system 600 is shown coupled to storage devices 620a-c, that may each include at least one director 622a-c coupled to at least one volume 624a-c, like that further discussed elsewhere herein, and that together form a storage pool 601. A control device 610 may be provided that is in communication with storage devices 620a-c. The control device 610 may include one or more thin devices, like the thin devices 71-74, and may include other components used in connection with functions of the system described herein.

It is noted that in various embodiments of RAID systems, one or more of the storage devices 620a-c may be a parity device that is used in connection with error correction capability of the RAID system including the use of parity information that is stored on the parity device. Alternatively, it is also noted that parity information may be stored across the storage devices 620a-c rather than being stored in one parity device. Furthermore, in various embodiments, operations involving communication between the storage devices 620a-c of the RAID system may provide mirrored copies of the data blocks replicated across the multiple storage devices and/or operations with portions of the data blocks that are distributed across the multiple storage devices (i.e. striping). Although illustrated with discrete storage devices, in various embodiments, the storage system 600 may include any number of different configurations of disks, disk drives or other storage media coupled to one or more interconnected directors, and it should be noted that other configurations and types of systems involving multiple, redundant storage may be used in connection with the system described herein.

In accordance with the system described herein, it is desirable to address the issue that while thin devices may be expanded as a file system runs, such thin devices may not be easily shrunk. The issue is that once allocated, storage spaces may not be later easily recycled even if they are freed by the file system. Known systems and techniques for reclaiming space, such as use of the Solutions Enabler product by EMC Corporation of Hopkinton, Mass. and "symconfigure" command, include checking all the storage chunks allocated for a specified thin device and reclaiming allocated, but unused (or invalid), storage chunks only if the storage chunks contain all zeroes. Space reclamation may not occur if any byte of a storage chunk is not zeroed. Utilities, such as SDelete, may be used to fill unused spaces of a volume with zeroes; however, such utilities may generate a large number of write I/Os that may have a disadvantageous impact on the system and other applications. As further discussed elsewhere herein, instead of zeroing each byte of a storage check, the system described herein provides for a feature to identifying each track of a storage device that is to be reclaimed.

Figure 13:
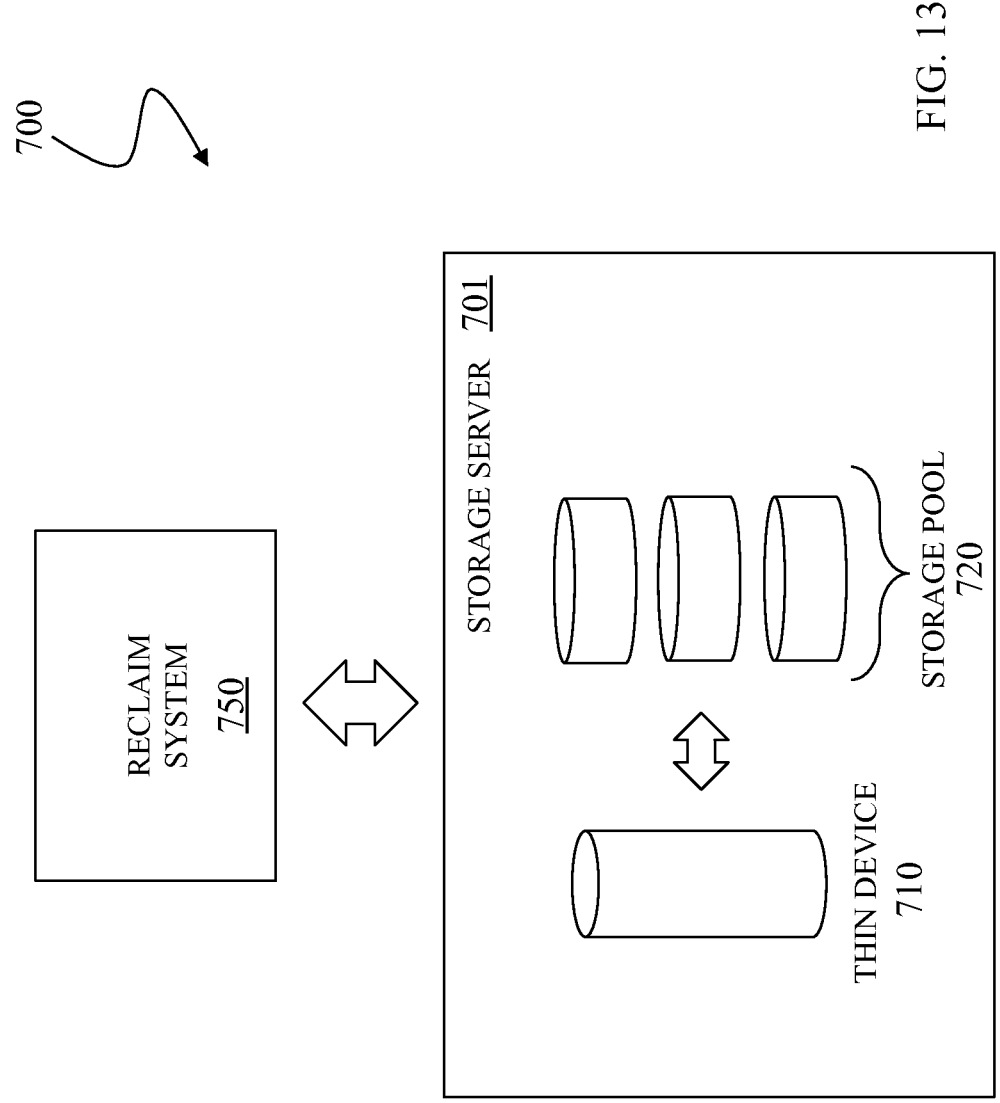
FIG. 13 is a schematic illustration showing a reclaim system according to an embodiment of the system described herein.

FIG. 13 is a schematic illustration 700 showing a reclaim system 750 according to an embodiment of the system described herein. The reclaim system 750 may interface with a storage server 701 that may include a thin device 710 and a storage pool 720 that are like the similarly-named elements discussed elsewhere herein. The reclaim system 750 may include a space reclaiming application and/or device such as a command line utility or other application that frees previously-allocated, but currently unused, storage space in a thin or virtual provisioning environment. The space reclaiming device may be used in connection with a maintenance operation performed upon determining that significant allocated space of a thin device is no longer being used or may be performed periodically to analyze a thin device and free appropriate space back to a thin device storage pool, as further discussed elsewhere herein. In an embodiment, the reclaim system/utility may run online while user applications are accessing a target storage volume.

Figure 14:
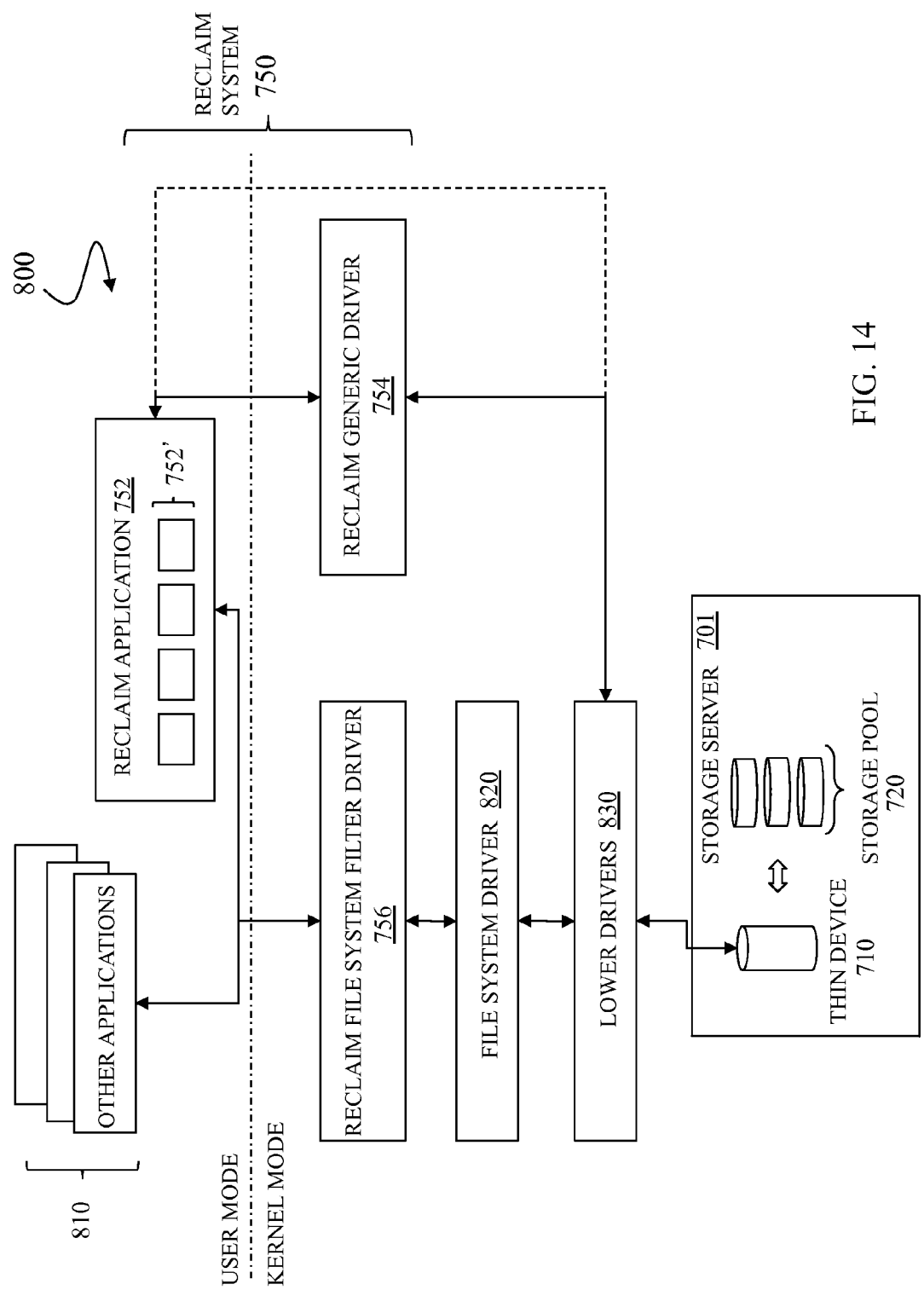
FIG. 14 is a schematic illustration showing a more detailed view of components of the reclaim system according to various embodiments of the system described herein.

FIG. 14 is a schematic illustration 800 showing a more detailed view of components of the reclaim system 750, and operation thereof, according to various embodiments of the system described herein. Components of the illustration 800 are shown with respect to operations in user mode and kernel mode. In kernel mode, executing code has trusted access to underlying system hardware and may execute any CPU instruction and reference any memory address. In user mode, executing code cannot directly access hardware or reference memory. Code running in user mode interfaces with system APIs to access hardware or memory, requesting access to the system resources via, for example, a system call. Other applications 810 running in user mode may attempt to access the storage server 701. A file system driver 820 and/or other lower drivers 830, running in kernel mode, may control access of user mode operations to the storage server 701.

The reclaim system 750 may include a reclaim application 752, a reclaim generic driver 754 and a reclaim file system filter driver 756. As further discussed elsewhere herein, the reclaim 750 may include one or more of these components, and include operation using only the reclaim application 752. In an embodiment, the reclaim application 752 may include modules and/or utilities 752' to control functions of user interface, driver interface, component management and/or task management, among other functions, as further discussed elsewhere herein.

A detailed discussion of the modules 752' is now provided according to various embodiments of the system described herein. The user interface module may receive user input to start a reclaiming task, to terminate the task and/or query information or other user instructions. The user interface module may also display output that indicates the effects of the users' operation. The driver interface module may send commands to one or more driver components and notify the driver components of expected behaviors and required information. The driver interface module may also receive information from other driver components. The component management module may control loading or unloading of driver components on demand. The task management module may initialize a reclaiming task after user input is received concerning a command to reclaim a volume. The task management module may further control the performing and ending of the reclaim process. The reclaim application 752 may further send reclaiming commands to the thin device 710. In various embodiments, the reclaim application 752 may send commands directly to the thin device 710 and/or may use one or more drivers, as further discussed elsewhere herein. The reclaim application 752 may include one or more binaries depending on the functions implemented. For example, the reclaim application 752 may include one binary for graphical user interface (GUI) and another for system service.

The reclaim application 752 may run in user mode and be coupled to a reclaim generic driver 754 running in kernel mode. The reclaim generic driver 754 may receive commands from the reclaim application 752 and send the received reclaiming commands to the target volume of the storage server 701. The commands may be send to the storage server 701 via the lower drivers 830 that may control access to the storage server, although it is noted that, in other embodiments, the lower drivers 830 may be incorporated into the storage server 701. The storage server 701 may receive and recognize reclaiming commands and may perform the reclaim process immediately upon receipt of the commands. In an embodiment, a reclaiming command may initiate the freeing of allocated storage blocks according to the processes discussed herein. It is noted that the reclaim generic driver 754 may be optional if reclaiming commands from user mode are not blocked by the operating system, and such an embodiment is illustrated by a dashed line from the reclaim application 752 to the lower drivers 830.

During the reclaim process, a reclaim file system filter driver 756 may monitor the I/O requests to the target volume. In an embodiment, the reclaim file system filter driver 756 may be attached to the target volume of the storage server 701 before the reclaim process is started. In an embodiment, if an IO request is indicated as having failed by the file system because there is not enough space on a disk of the storage server 701, the reclaim process may be aborted and the IO request subsequently reissued to the file system. The reclaim file system filter driver 756 may hold the I/O request and notify the reclaim application 752 of the event. The reclaim application 752 may control the aborting of the reclaim process, delete the balloon files (described in more detail below) and tell the reclaim file system filter driver 756 that these acts have occurred. The I/O request may then be reissued to the lower driver 830 by the reclaim file system filter driver 756. In this way, no IO requests would fail because of the reclaim process, and the reclaim process may be performed without disruption to I/O processing. The reclaim file system filter driver 756 may be detached after the reclaim process is ended, no matter whether the reclaim process is completed or aborted.

An embodiment of the space reclaim process performed by the reclaim system 750 will be explained in more detail elsewhere herein. By way of example, assume the thin device 710 is a thin device with capacity of 100 GB. The thin device 710 may be presented to a Microsoft Windows® platform and a storage volume, such as a New Technology File System (NTFS) volume and/or a fat allocation table (FAT) file system volume, lies in a storage disk of the storage pool 720. In the example, assume the thin device has 20 GB of valid data while 80 GB spaces had been previously written but are no longer being used. Accordingly, from the view of a storage server 701, 100 GB of space from the storage pool 720 has been allocated to the thin device 710 According to the system described herein, it may be determined that the 80 GB of previously allocated, but no longer used, space is to be returned to the storage pool (i.e. reclaimed).

An embodiment for a reclamation process, that may be used in connection with the system described herein, includes include creating one or more balloon files in the target volume to occupy the unused spaces of the file system is described in U.S. patent application Ser. No. 12/924,388 to Balcha et al., filed Sep. 27, 2010, and entitled "Storage Space Reclaiming for Virtual Provisioning," and is incorporated herein by reference. In an embodiment described therein, a utility may be used to create balloon files. After the balloon files are created, the file sizes of the balloon files may be set to variable (e.g., large) amounts, corresponding to the amount of the storage space that is to be reclaimed. In various examples, the size of the balloon files may be 100% of the previously allocated, unused space and/or may be a smaller amount, such as 80%-90% of the previously allocated, unused space. As a result, the unused spaces filled by the balloon files will not be used by any other user applications (until being returned to the storage pool), no matter what is done to the spaces by the space reclaiming utility. Data consistency may therefore be guaranteed.

Figure 15:
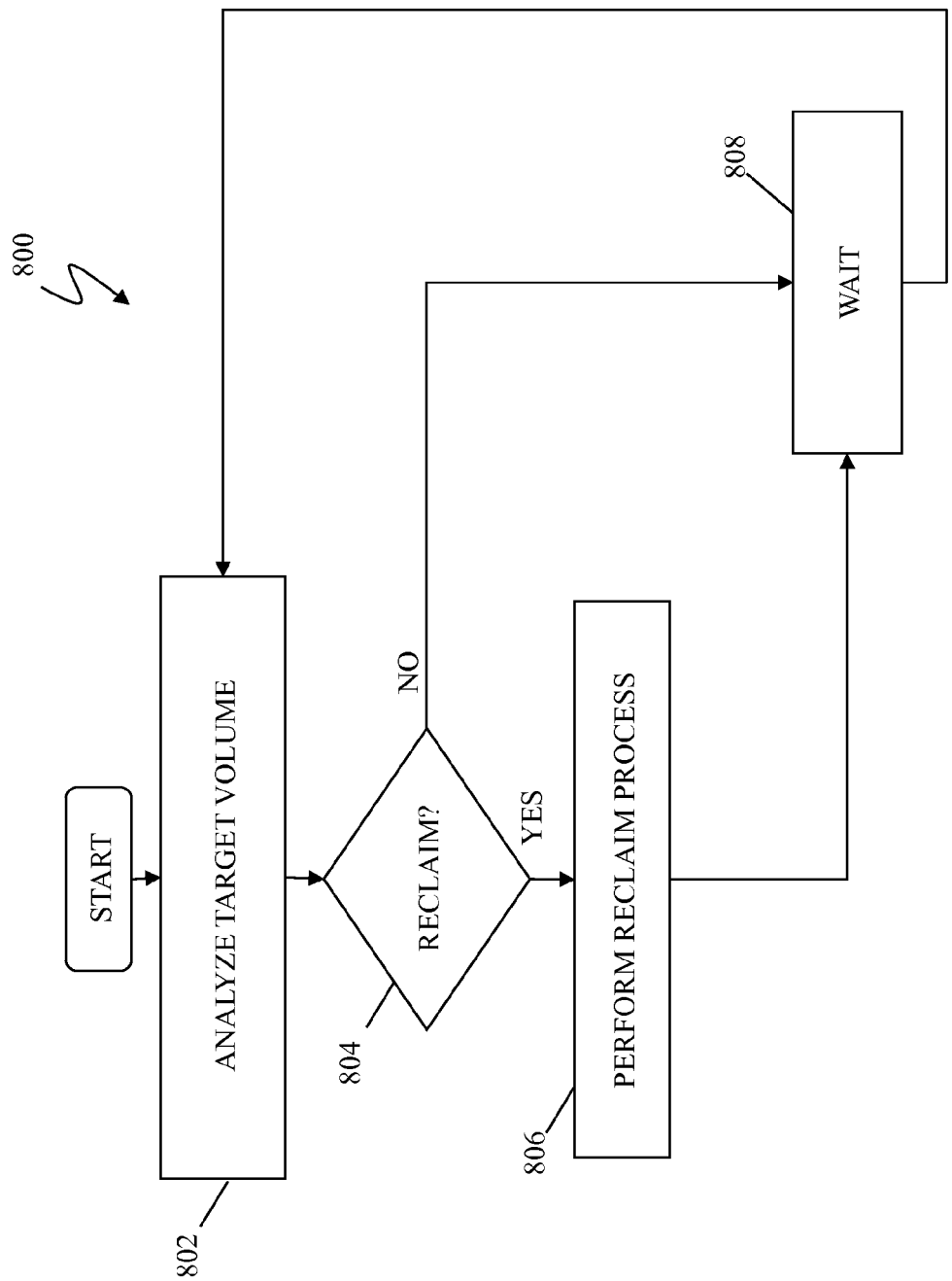
FIG. 15 is a flow diagram showing processing for determining initiation of the reclaim system and/or utility.

FIG. 15 is a flow diagram 800 showing processing for determining initiation of the reclaim system according to an embodiment of the system described herein. At a step 802, a target volume of a virtual provisioning environment is analyzed to determine how much provisioned space of the target volume has been previously allocated but is presently unused (and/or contains invalid data). In an embodiment, the reclaim application and/or other control device, as further discussed elsewhere herein, may be used to analyze storage space usage of a target volume in the virtually provisioned environment. After the step 802, processing proceeds to a test step 804 where it is determined whether to initiate the reclaim system. In various embodiments, the determination processing performed at the test step 804 may include automatic initiation as part of a maintenance operation to initiate space reclaiming if a threshold amount or percentage of space of the target volume is determined to be allocated but unused.

Alternatively, a user may manually initiate the space reclaim processing, for example, in response to a prompt informing the user that a certain amount or percentage of space of the target volume is appropriate for a reclaim process. Accordingly, if, at the test step 804, it is determined that space reclaim processing is not to be initiated, then processing proceeds to a waiting step 806. In various embodiments, the waiting step may include waiting for a specified period of time according to periodic maintenance operations and/or waiting for user input and/or other type of system or administrator input that causes a target volume to be analyzed for purposes of reclaiming space. After the waiting step 808, processing proceeds back to the step 802 where analysis of the target volume is performed. If, at the test step 804, it is determined that space reclaim processing is to be initiated, then processing proceeds to a step 806 where a reclaim process is performed, as further discussed elsewhere herein. After the step 806, processing may proceed to the waiting step 808.

According to embodiments of the system described herein, a storage system, such as a Symmetrix system, may include a reclaim system that provides for marking each track that is intended to be reclaimed in one or more storage devices and detecting and reclaiming such tracks. The system may include one or more features and/or utilities that may be used to mark, detect and return tracks to a free track pool of the virtual provisioning storage system in connection with reclaiming space for one or more thin CKD devices, as further discussed in detail elsewhere herein. As used herein, the features and/or utilities for the reclaim processing may be referred to herein as "Zero Reclaim." In various embodiments, the system described herein is discussed in connection with zOS; however, the system described herein may be used in connection with any appropriate operating system. Additionally, various embodiments of the system described herein may apply and be used, where appropriate, in connection with types of devices other than CKD devices, such as, for example, Fixed Block Architecture (FBA) devices.

Reclaim processing according to the system described herein may be used to identify track that is to be reclaimed for a thin storage device, such as a CKD device. A track may be identified for reclamation by issuing a track erase command that may erase a track and/or otherwise mark a track as erased. In various embodiments, the track erase command may be a prefix command (CCW) and/or may write a record zero (R0) to the track. Reclaim processing may further detect tracks that have been marked as being erased, for example, tracks that have only a standard record zero present (and no other records) and return those tracks to the free track pool.

An implementation according to the system described herein may further operate in connection with a feature of Symmetrix called Symmetrix Differential Data Facility (SDDF). An SDDF session is a Symmetrix session that may be used to monitor changes on a Symmetrix device. The SDDF session may maintain its own bitmap with a bit for every device track. The SDDF session may be used to identify tracks that may be reclaimed based on operation of the Zero Reclaim features according to the system described herein. Although the discussion herein is principally provided in connection with the SDDF session, it is noted that the system described herein may be suitable used with any session and/or operation that has features performs functions like that of the SDDF session.

In an embodiment, and as further discussed elsewhere herein, the reclaim processing may include execution of a scratch exit task (e.g., zOS scratch exit task) and/or a control subtask (e.g., Symmetrix Control Facility (SCF) subtask) may be implemented and performed by one or more of the scan utility and/or reclaim utility according to the system described herein. The scratch exit task will record when a (zOS) dataset is indicated for erasure on a thin device in order to eventually cause the available track space to be returned to the Symmetrix free track pool according to the an embodiment of the system described herein. The system described herein may provide options to: scan a volume table of contents (VTOC) for available tracks in the volume free space and update an SDDF session information with the free space (e.g., the scan utility of the system described herein); and analyze the volume free space and SDDF session information, and then perform the clearing and reclaiming of the tracks (e.g., the reclaim utility of the system described herein). The scheduling of the scan and/or reclaim utilities of the reclaim system may be a main purpose of the control (SCF) subtask, as further discussed elsewhere herein.

Figure 16:
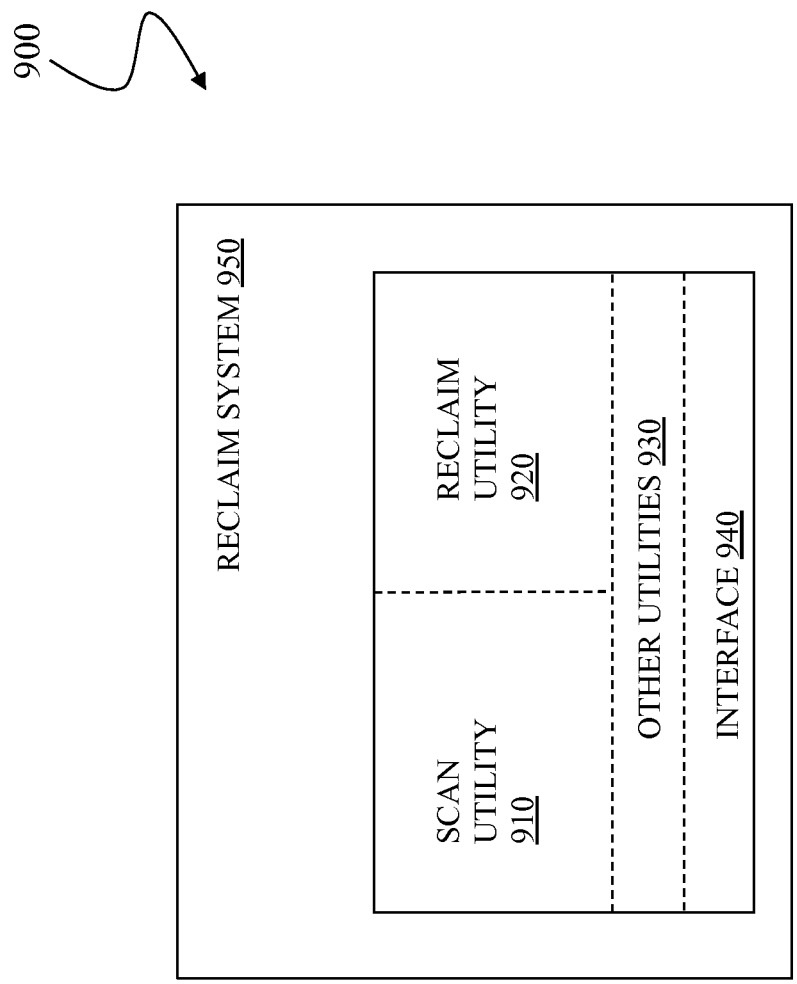
FIG. 16 is a schematic illustration showing components of a reclaim system according to an embodiment of the system described herein that has the features and performs the operations of the reclaim processing that are discussed herein.

FIG. 16 is a schematic illustration 900 showing components of a reclaim system 950 according to an embodiment of the system described herein that has the features and performs the operations of the reclaim processing that are discussed herein. The reclaim system 900 may include a scan utility 910 and a reclaim utility 920. Although principally illustrated as two utilities, the scan utility 910 and the reclaim utility 920 may also represent functions performed by one utility and/or module (illustrated by dashed lines in connection with the illustration of the scan utility 910 and reclaim utility 920 along with other components noted herein). As further discussed elsewhere, the scan utility 910 may scan a volume table of contents (VTOC) for available tracks in the volume free space and update an SDDF session information with the free space. The reclaim utility 920 may analyze the volume free space and SDDF session information, and then perform the clearing and reclaiming of the tracks.

The reclaim system 950 is further illustrated with other utilities 930 and an interface 940 that may be provided in connection with the system described herein. The other utilities 930 may perform additional functionalities, as discussed in detail elsewhere herein. For example, one or more other utilities may perform functions in connection with assigned attributes to one or more files or thin devices in connection with the thin pool. Specifically, in various examples, one or features may be assigned attributes that bind or unbind specific thin devices (e.g., BIND/UNBIND attributes) to specific thin pools and/or may be assigned attributes concerning conditions under which tracks associated with a thin device are assigned to the thin device (e.g., PREALLOCATE/PERSIST attributes), as further discussed elsewhere herein. The interface 940 may provide for input of user settings and display of information to a user in connection with operation of the system described herein.

Four phases of operation of the reclaim system 950 according to the Zero Reclaim functionality described herein may be performed to provide for previously allocated and used tracks to be reclaimed and returned to the free track pool. These phases are described as follows:

(1) Identify what is to be reclaimed by running the scan utility. Performance of the scratch exit task may identify the tracks. This is a purpose of the SDDF session, to record and remember the tracks that may be suitable to be reclaimed.

(2) Mark the tracks to be reclaimed using the reclaim utility. The reclaim utility will check the tracks identified in the SDDF session against the actual VTOC free space and then erase ("scratch") the contents so that a Zero Reclaim task will find them. Alternatively, for small amounts of data, this may be performed by the scratch exit task done by the scan utility.

(3) Notify the Symmetrix to start looking for tracks to be reclaimed and placed into the free track pool. This may be done by the reclaim utility. Without the reclaim utility being run, the Symmetrix would not normally go looking for tracks to be reclaimed.

(4) Perform the Zero Reclaim task that may run (e.g. in the background at a low priority, and potentially very slowly) and discover the erased tracks and release them to the free track pool. The Zero Reclaim task may be performed by the reclaim utility.

The SDDF session may be created on each device that is being monitored according to the system described herein. The SDDF session may be created/removed by a utility program of the system described herein. The SDDF session may be used for bookkeeping purposes and there is a time element involved between when tracks are identified to be returned to the free pool and when the tracks are actually processed for return. It is noted that the functionality of the SDDF session described herein for identifying tracks for return to the free track pool may be performed in addition to normal write recording processor of an SDDF session. The process of clearing the tracks for return to the free track pool may not otherwise have an impact on the SDDF session. However, a write of the SDDF session as normal may remove a track, that was designated as a candidate for being returned to the free pool, from the reclaim processing.

A SDDF session may include a bitmap where each bit of the bitmap corresponds to a logical track. It is device related, so each logical device may have zero or more SDDF sessions. In normal operations of an SDDF session, the SDDF bitmap has all bits turned off (set to zero). When a host write operation occurs to a track, the corresponding SDDF bit is turn on (set to one). A host application may also turn on and off the bits individually or collectively. In the system described herein, the SDDF session bitmap may be used in an alternative manner to indicate whether host processing is to occur in order to reclaim tracks.

In an embodiment, the SDDF bitmap according to the system described herein may have all bits turned on (set to one) in the "initial state". When a dataset is scratched, the bits corresponding to the tracks being released from the dataset are turned off (set to zero). These tracks (indicated by the zero setting) are the candidates for reclaim processing; the tracks are no longer in use from the host perspective.

When the SCF subtask initializes a device for monitoring the first time, the SCF subtask will establish an SDDF session on the device and initialize every track as "written (bit turned on)." This is the initial state of the device. There may be an option to match this initial state with the free space using the zOS VTOC free space map for the device (e.g., as performed by a scan with the scan utility). The scratch exit task may update the SDDF session (bit turned off) for any tracks that belong to datasets being scratched. The SCF subtask may then look at the SDDF session contents to determine what tracks need to be reclaimed. If the session shows a track as "written to (bit on)", that track will be ignored for reclaim purposes. If the session shows a track as "not used (bit off)", then that track may be reclaimed. An I/O to clear the tracks may be performed to tracks that can be reclaimed. A single I/O will clear multiple tracks. After the clearing completes, the SDDF session will be updated to indicate that the processing was successful.

TABLE 1 shows the meanings of ON and OFF SDDF bit settings:

TABLE 1

SDDF Bit Setting and Meaning

| SDDF Bit Setting | Meaning |
| --- | --- |
| Bit is ON (one value) | The corresponding track is not eligible for reclaim. The bit will be initially set when the SDDF session is created (initial state). Reclaim processing will also update the SDDF session when it clears the tracks to be reclaimed. It will also be set when the track is written to by a user or system application. The setting of the SDDF bit does not reflect whether the track is backed by physical storage. It is simply used as an indicator for tracks that may be eligible for reclaim processing. |

TABLE 1-continued

SDDF Bit Setting and Meaning

| SDDF Bit Setting | Meaning |
| --- | --- |
| Bit is OFF (zero value) | The corresponding track has been freed in zOS, but not yet reclaimed. The track is eligible for reclaim processing. After the track is erased, the bit will be set back on by the reclaim utility. Note, in the time period from when this bit is set off (indicating reclaim eligible) and when reclaim processing occurs. If the space is subsequently allocated to a dataset and written, the writes will implicitly set the bit back on, avoiding reclaim processing. The setting of the SDDF bit does not reflect whether the track is backed by physical storage. It is simply used as an indicator for tracks that may be eligible for reclaim processing. |

In an embodiment, the Symmetrix system may monitor the SDDF session and perform track reclamation based on the setting of the SDDF session. A syscall may specify the SDDF session, and the syscall processing may reclaim tracks as indicated in the SDDF session.

In an embodiment, the scratch exit task may be automatically invoked by zOS each time a dataset is being scratched. One or more extents for the dataset may now be available for reassignment by zOS. If the storage device is being monitored, the scratch exit will "record" this activity by updating a SDDF session. The normal state of the SDDF session is to indicate that all tracks have been written. When an extent is scratched, the corresponding range of tracks in the SDDF session will be reset to indicate "no write". If the tracks are subsequently written to, the corresponding SDDF track will indicate that the track is in use. There is one special circumstance where the scratching of a dataset will not cause the SDDF session to be updated. This is when an internal dataset (this is the dataset temporary allocated in order to obtain exclusive control for use during reclaim) is allocated and subsequently scratched. In an embodiment, the internal or temporary dataset may be implemented as a balloon file, as further discussed elsewhere herein.

An option available through the SCF subtask is the Scratch Reclaim threshold. The threshold may be a small number (e.g., 20). This number is passed to the scratch exit task and, if the area being scratched is below the scratch reclaim threshold, the clearing of the tracks may occur immediately in the scratch exit task. This avoids the overhead of the SDDF session update and the notification of the SCF subtask, but it is noted that, in some cases, this may disadvantageously encourage thrashing of the space management on some volumes in which the set of tracks are continually allocated and reclaimed.

In an embodiment, a file name exclusion list may be used in connection with the system described herein and may be loaded by the SCF subtask and available to the scratch exit task. It would allow multiple masks (with wildcarding) of dataset names that would not be processed for space reclamation. If the scratch exit task were entered for processing one of these datasets, the task would continue processing without any space reclamation. In such a situation, it is then noted that the dataset would be scratched (erased) but the tracks thereof not reclaimed.

A device that is not being monitored according to the system described herein would not have an SDDF session. An in-memory table of monitored devices may be used for fast-path processing, rather than having to perform an I/O to the device in order to determine whether an SDDF session is present. In an embodiment, a scan of the devices known to SCF may occur and thin devices identified. The in-memory table of the monitored devices may be established in persistent storage and used to communicate with the scratch exit task. Only devices in this table will be monitored by the scratch exit task. Implementation of this table may be done in a fashion similar to a host-based flash copy device table.

Attributes may be set using an interface provided by a utility of the storage system (e.g., Symmetrix). In various embodiments, the system described herein may assign attributes to thin devices that impact the association of the thin device with one or more thin pools and in connection with the assigning of physical track space to the thin device. For example, a BIND command associates a thin device with a particular thin pool and an UNBIND command de-associates the thin device form the particular thin pool. Further, a PREALLOCATE attribute ensures that physical track space will be pre-assigned to the thin device, while a PERSIST attribute ensures that the physical track space will not be reclaimed. In a particular example, if a thin device is detected that has undergone BIND processing and is created with PREALLOCATE and PERSIST, the system described herein may provide that the thin device will not be monitored for reclaim processing.

Each monitored device may be examined for the SDDF session. If the SDDF session does not exist, one may be created and initialized to all used (write bits all on). For first time devices, processing for the "initial state" will be scheduled. The initial state is the first time processing for a device that is being monitored, as further described elsewhere herein In most cases, this occurs once per device.

In other embodiments, however, there may be situations where our scratch exit may not be active on a system, or other conditions may occur, that make it desirable to cause a resynchronization of the zOS and Symmetrix views of the track data. This has no impact on the availability or accessibility of the user data, but has an impact on the track usage such that some tracks may remain allocated when the tracks would otherwise be eligible for reclaim.

A user command (e.g. scan command) may be used to force a resynchronization to occur on demand. In such a case, the zOS free space map is read and all available tracks in the free space map are so indicated in the SDDF session. This will eventually cause all free tracks to be cleared and erased. This forces all zOS free tracks to eventually be turned into reclaimed tracks in the Symmetrix. If a track is cleared that does not have a physical track assigned, the Symmetrix ignores the operation. No data is being written and there is no reason to store it.

In another embodiment, the system described herein may ignore the initial state and assume that the zOS map of datasets matches the Symmetrix assigned tracks. The SDDF bit mask may left alone and no additional work is done. In another embodiment, the zOS free space map may be used, but instead of marking ALL tracks in the SDDF session, only free cylinders, or perhaps large chunks of cylinders in size, are identified. In yet another embodiment, the system described herein acquires information about free tracks from the zOS free space map and the Symmetrix thin device allocated space map. This involves the ability to retrieve a map of tracks in a device in a manner where it can be determined which tracks are physically allocated (backed) and which tracks are not allocated (not backed). The two maps are matched up and only tracks that are actually assigned in the Symmetrix, but not assigned by zOS, are queued up to be reclaimed. This embodiments advantageously provides for minimal I/O and maximum reclaim, but may cause a significant impact on operation of the Symmetrix.

The following TABLE 2 shows commands according to various embodiments that may be input via one or more interfaces to the scan and/or reclaim utilities of the reclaim system described herein in connection with the performance of described tasks:

TABLE 2

Command Inputs

| | |
|---|---|
| RECLAIM | User indicates that a particular device, range of devices, or pool of devices are to be immediately processed. Those devices will be marked for processing and "work waiting" scheduled. |
| DISPLAY | Displays various device and task options. The current SCF task processing options will be displayed. If DEVICE is also specified, detailed information about all devices (or a particular device or range of devices) will be displayed. |
| REFRESH | Reexamines the devices known to SCF and ensures that the persistent device table accurately reflects the thin devices being monitored. If the SCF INI information has been reloaded, this command will cause the device table to resynchronize with it. This may occur automatically based on a timer in order to detect device changes (like the BIND of a thin device with the PERSIST option). |
| SCAN | User indicates that "initial state" processing is to occur for a device. |
| HOLD | Disables the automatic scheduling of the RECLAIM processing for a particular device or range of devices. |
| RELEASE | Re-enables the automatic scheduling of the RECLAIM processing for a particular device or range of devices. |
| STOP | Turns off monitoring for a particular device or range of devices. This is not a persistent option. If SCF TRU task is restarted (SCF restarted), monitoring will start again. |
| START | Turns on monitoring for a particular device or range of devices. |

In an embodiment, the system described herein may provide for automated reclaim processing. Some automatic processing may be limited to particular times of day, or after some amount of time has passed. In connection with determining that one or more devices need to be processed, the following steps may be performed. The persistent device table may be examined for which devices are to be processed. Additional subtasks may be created to process the devices. The SDDF session information may be read. The zOS free space map may be read to ensure that space has not been re-assigned to another dataset to ensure that exclusive access is provided to the tracks being reclaimed. For small amounts of tracks to be reclaimed, the device may be protected (e.g., a SYSVTOC RESERVE command) and each track will be cleared. For a large amount of tracks to be reclaimed, a dataset will be allocated over the space to be reclaimed. Then each track will be cleared. After all tracks in the temporary dataset have been cleared, the dataset will be scratched. This scratch may be "special" in the sense that the scratch exit task may not update the SDDF session when this special dataset is scratched.

Each time the scratch exit task updates a SDDF session for a device, the scratch exit task may also update the persistent device table with this information. Statistics may be provided with the DISPLAY command. The statistics may include, for example, number of scratches, number of tracks released, number of extents released, time of last scratch, among others.

In an embodiment, it is noted that when a thin device BIND occurs, it is possible that the thin device will have the PERSIST attribute assigned. If a utility (e.g., an RPB GPM Utility) is used to BIND the device, the utility will notify the SCF subtask that the device needs to be refreshed. This will cause a single-device refresh to occur and will allow the SCF subtask to automatically initialize the SDDF session and ensure that the device will be monitored. If the PERSIST volume level attribute is also specified, the SDDF session will not be created and monitoring will not occur. Additionally, the zOS RPB Utility can notify the SCF subtask when an UNBIND occurs. Monitoring of the device is no longer necessary and the SDDF session can be released.

Several methods may be used for processing the tracks to be reclaimed. One or more of the methods may be selected by a user setting. This may be controlled by a user setting, automatically determined, e.g., based on a default configuration, and/or and combinations of methods may be provided in appropriate circumstances. Examples of the methods for processing tracks to be reclaimed as set forth as follows:

- From beginning of device to end of device—start at the beginning of the device and reclaim all tracks until the end of the volume is reached.
- From end of device to beginning of device—start at the end of the device and reclaim all tracks until the beginning of the volume is reached.
- Largest segment to smallest segment—sort down the segment by size and process the largest first.
- Only segments greater than a certain size—only process segment that are larger than requested.
- Use a reserve method (e.g., SYSVTOC RESERVE) when space to be freed is less than a specified number (N) of tracks. Additionally and/or alternatively, the dataset method may be used when the space to be freed is greater than N tracks. The reserve method may be used when the reclaim utility is run as a subtask of SCF or the device is offline.
- Limit the reserve method time to a specified number (M) of seconds (in $1/100$ units)
   - if the system reservation method is used, only hold the reverse for M/100 seconds before releasing and allowing other work to occur.
- WAIT X seconds (in $1/100$ unit) between reserve processings—If the reserve method is used, wait X/100 seconds between reverses to allow other work to occur.
- Only perform reclaim processing during certain hours of the day (e.g., 10 pm and 5 am).
- Only process a device after XX seconds (in seconds) have elapsed since the last scratch.
- Limit the number of "initial state" subtasks that will be allowed.
- Limit the number of device processing subtasks that will be allowed.
- Identify devices to be processed (different from devices to be monitored). All potential devices will be monitored on each logical partition (LPAR). The devices will all be updating the same SDDF session, but processing the reclaim of tracks for devices may be limited to certain LPARS. For instance, test devices may only have reclaim scheduled on a test LPAR and productions devices may only have reclaim scheduled on a production LPAR. This may keep multiple LPARs from churning against the same devices that are high-activity.
- Only process devices in a pool that is >YY % full. Ignore devices that are in a pool with less than YY % free space.
- Only process a device if the device % busy, channel % busy or CPU % busy is within limits.
- Limit the number of devices that are to be processed simultaneously that belong to the same thin device pool.

In another embodiment, the reclaim utility may be enhanced to provide an option at execution time for either clearing each track individually (initial implementation) or issuing a Deallocate Pending Syscall. The Deallocate Pending Syscall starts processing of tracks as a background task and is polled for completion.

In another embodiment, the reclaim utility may have the ability to automatically start the Zero Reclaim background task in the Symmetrix on a device. Normally, this task is not running in the Symmetrix. During and after a reclaim operation, the task may be initiated. At the end of reclaim processing, the Zero Reclaim background task will be started on the Symmetrix for the device just processed. Also, during processing, after a specified number (e.g., 1000) cylinders have been reclaimed, it will also be started in order to get a head start on the reclaim activity.

A particular situation may occur that is a side effect of initial monitoring of existing thin devices. Specifically, when an existing dataset has allocated space and allocated tracks, some of the allocated space may not really be used. This is common in customer environments. For example, when a data reorganization command (e.g., VSAM REORG) occurs, the data contents may be reprocessed and reloaded. The physical VSAM dataset may not be scratched, rather it is reloaded. Space at the end of the dataset may no longer be used, but the Symmetrix does not know this and the tracks will remain assigned. Sub Allocation Management is the ability to examine a dataset or volume and detect areas of allocated space that are not used. In a zOS VTOL, this may be referred to as the HiTTR or the HURBA. Space after the HiTTR or HURBA, and before the end of the dataset, is essentially dead space and does not need to be backed in the Symmetrix. In order to "go inside" of a dataset and cause tracks to be released, exclusive access to the dataset is required. In zOS terms, this requires gaining access to the dataset with DISP=OLD. This then guarantees that no other application will be writing to the dataset and potentially bump into activity inside the dataset.

When a dataset is scratched, the contents of that dataset remain on the physical tracks in the Symmetrix. Even when the track is reclaimed and returned to the Symmetrix free space pool, the contents are still present. In an embodiment, the system described herein may provide a secure erase task to write over the contents of a dataset with specific patterns of data in order to physically change it so that the contents are no longer in the Symmetrix. This may be accomplished by performing a full track write of a single record with specific bit patterns.

As further discussed elsewhere herein, there is a possibility that some devices will have many allocations and scratches occurring in relatively short periods of time, called thrashing. Overall, it is desirable to monitor the devices, but if the same set of tracks are being regularly allocated, written to (assigning back-end physical storage), and then scratched (eventually causing the back-end physical storage to be reclaimed), it is desirable to detect and avoid this thrashing. According to the system described herein, a thrashing monitor may be provided that enables leaving active areas on devices alone and/or wait until the major activity has ceased before performing Zero Reclaim processing according to the system described herein. This would be intelligent monitoring of the allocated and scratched space over time.

A feature of the Symmetrix PREALLOCATE and PERSIST attributes is that physical track space is permanently assigned to the device. There is no penalty for first write to a track, and never the opportunity to run out of space for existing devices. This feature may brought down to the dataset (file) level. When a dataset is allocated in zOS, the same Symmetrix PREALLOCATE and PERSIST features may be assigned to that file. For the PREALLOCATE feature, this may ensure that the entire logical dataset is physically backed. If any tracks are not physically backed, a record may be written to the track and force it to be backed. For the PERSIST feature, this dataset would automatically be include in the exclusion list of dataset for the scratch exit and reclaim processing. Since this would be on the dataset level and not the volume level, this would ensure that only the host logically used dataset would be backed in the Symmetrix.

The following discussion provides examples and description of operational states of the system described herein. TABLE 3 provides definitions and descriptions of various states.

TABLE 3

Definitions

| View | State | Description |
| --- | --- | --- |
| Host | VTOC | Alloc | Allocated in the zOS VTOC means space set aside for use by a dataset |
| Host | VTOC | Free | Free in the zOS VTOC means that the space is not being used by any dataset and is available to be assigned for use by a dataset |
| Host | Data | Valid | Live data is the portion of a zOS dataset that contains usable data. For most datasets, this is the area below the HURBA or HiTTR that is recorded in the zOS VTOC/VVDS. |
| Host | Data | NotValid | Dead data is the portion of a zOS dataset that does not contain usable data. For most datasets, this is the area above the HURBA or HiTTR that is recorded in the zOS VTOC/VVDS. |
| Symm | SDDF | Write(1) | Monitoring refers to the SDDF setting where the bit is set on. |
| Symm | SDDF | NoWrite(0) | Reclaim Eligible refers to the SDDF setting where the bit is set off |
| Symm | Thin Device Track State | Backed | Backed in the Symmetrix indicates that a physical track in the pool is assigned to a logical track. |
| Symm | Thin Device Track State | Unbacked | Unbacked in the Symmetrix indicates that the logical track does not assigned to a physical track. |

Table 4 is an example of a state table for VTOC and SDDF and Symmetrix assigned tracks. It is noted that the initial state setting is the setting in the SDDF session after the session has been created and before the first scan. When the SDDF session is created, all of the bits will be set to the Write (1) value. Over time, the scratch exit may set some of the bits to a NoWrite (0) setting, but until the first scan is run, the session will still be considered to be in "initial state".

TABLE 4

State Table for VTOC and SDDF and Symmetrix Assigned Tracks

| zOS VTOC | Data | SDDF Setting | Symmetrix View | Comments |
| --- | --- | --- | --- | --- |
| Alloc | Valid | Write(1) | Backed | This is the normal situation for valid data in the user dataset. |
| Alloc | Valid | Write(1) | Unbacked | zOS thinks that there is valid data in the dataset, but the Symmetrix does not have any data in the backend. In normal situations, this should not occur. There are edge conditions where this may be a valid state for a very short period of time, for example, during a utility restore of a dataset. |
| Alloc | Valid | NoWrite(0) | Backed | zOS and the Symmetrix think that there is valid data in the dataset, but the SDDF mask indicates that the track is eligible to be reclaimed. Once the reclaim is processed, the data Backed will be lost. In normal situations, this should not occur. There are edge conditions where this may be a valid state for a very short period of time, for example, during a utility restore of a dataset. |
| Alloc | Valid | NoWrite(0) | Unbacked | The track is Reclaim Eligible, but this is not necessary because the storage is not backed. In normal situations, this should not occur. |

TABLE 4-continued

State Table for VTOC and SDDF and Symmetrix Assigned Tracks

| zOS VTOC | Data | SDDF Setting | Symmetrix View | Comments |
|---|---|---|---|---|
| | | | | There are edge conditions where this may be a valid state for a very short period of time, for example, during a utility restore of a dataset. |
| Alloc | Not Valid | Write(1) | Backed | The track has previously been written but the contents are no longer pertinent. This would normally occur when a dataset has been reorganized or rewritten without being scratched. |
| Alloc | Not Valid | Write(1) | Unbacked | This is the normal situation for allocated, but unused space in a dataset. |
| Alloc | Not Valid | NoWrite(0) | Backed | This is the normal situation for a newly created dataset where the unused space in the dataset has not yet been reclaimed. |
| Alloc | Not Valid | NoWrite(0) | Unbacked | This is the normal situation for a newly created dataset when the unused space in the dataset has not yet been reclaimed. The space was never used by the previous dataset before it was scratched. |
| Free | Valid | Write(1) | Backed | Should Not Occur |
| Free | Valid | Write(1) | Unbacked | Should Not Occur |
| Free | Valid | NoWrite(0) | Backed | Should Not Occur |
| Free | Valid | NoWrite(0) | Unbacked | Should Not Occur |
| Free | Not Valid | Write(1) | Backed | This is possible after "initial state" occurs. The space is Backed but reclaim has not occurred. |
| Free | Not Valid | Write(1) | Unbacked | This is a normal situation where the track space is not allocated to any dataset and the Symmetrix is not backing the track image. |
| Free | Not Valid | NoWrite(0) | Backed | This may occur after "initial state" processing occurs or after scratch exit processing. The Free space has been detected and reclaim processing will recover the Backed tracks. |
| Free | Not Valid | NoWrite(0) | Unbacked | This may occur after "initial state" processing occurs or after scratch exit processing. The Symmetrix space was not currently used. The free space has been detected and reclaim processing is scheduled but not necessary. |

The scratch exit task locates the device entry in common storage tables. The device entry must show that thin reclaim processing (Zero Reclaim) is enabled for the device. Additionally, the device entry may contain the SDDF session information used for tracking the SDDF session. Then a check is made to see whether the reclaim task temporary dataset is being scratched. The reclaim task temporary dataset is not monitored.

If exit processing of scratched tracks is enabled, a check is made to see whether the extent being scratched can be processed locally. If the extent is within limits, the track erase processing will occur here and further processing (SDDF update) will not take place. Note that for extents of 20-tracks or less, the trade-off in I/O should be similar (I/O for erase vs. I/O for SDDF). Next is the SDDF bitmap update. The tracks corresponding to the extent are set in the SDDF bitmap and the SCF TRU Monitor task is posted.

Initialization of the SCF subtask may begin by creating a control block in common storage used for Zero Reclaim communications and anchoring a Zero Reclaim device table. Next is the reading in the SCF initialization parameters that apply to the Zero Reclaim environment. Finally the SCF devices are scanned, and any thin devices found are matched against the Zero Reclaim include/exclude list. Thin devices with the PERSIST attribute can be found in the device list, but will not be monitored.

In various embodiments, the SCF subtask may include waiting for work, and scheduling work. Whenever activated, the SCF subtask may scans the Zero Reclaim device table to see if any devices have needs. Most needs result in scheduling the SCAN or the reclaim utility. But other activities include handling new device BIND or old device UNBIND or processing of commands like HOLD/RELEASE or START/STOP.

The scheduling of the scan and/or reclaim utilities of the reclaim system may be a main purpose of the SCF subtask. The scan and/or reclaim utilities may be scheduled to run in two different environments and, in some embodiments, may be user controlled. One way is to run as a subtask of the SCF subtask. The other is to be submitted as a zOS Started Task (which can be also be user initiated via a batch job) and run outside of the SCF environment. While the scan utility is very fast (typically less than one second), the reclaim utility may take longer (e.g., several minutes).

Because the activity of the reclaim utility will have the most impact on other activity occurring on the device, the scheduling of the reclaim utility activity may have several options. First is limiting the number of reclaim tasks that can be run simultaneously may be limited. Next, time-of-day limitations may be applied. Other options include CPU %, CHAN % and DEV % limits. Further, the scratch exit task related wait time may be controlled. The idea is that if a user batch job scratches a dataset, it may shortly thereafter allocate a new dataset in its place. So there may be a wait time available which will allow the new user allocation to occur before we attempt to reclaim the space.

In an embodiment, the reclaim utility may accept three parameters, first is the reclaim operation command, second is a device identifier and third is a keyword "DEBUG". The device may be online or offline. The device may have a VTOC Index. The device may be channel attached and have the identifier available. The reclaim utility may run in a logical partition (LPAR) with SCF active, and the Zero Reclaim environment may be active in SCF. Finally, the device maybe a thin device that is being monitored by the SCF subtask and have a SDDF session.

The reclaim utility may operate in a series of passes. Each time, the reclaim utility may issue a reserve command to obtain a reversed area (SYSVTOC RESERVE), perform some work, and release the SYSVTOC RESERVE before starting over. One exception to this is if the device is offline to all LPARS. Devices that are offline to an LPAR are supported, but the temporary dataset method cannot be used in this situation. Normal processing (top of each pass) begins by obtaining the SYSVTOC RESERVE and starting a SYSVTOC RESERVE hold timer. Once the timer expires, the SYSVTOC RESERVE will be released. However, while holding the SYSVTOC RESERVE, the TRU SDDF session will be read from the device. Next the zOS VTOC free space information may be read from the device. Then a merge of the two tables may occur. A list of "hunks" will be created identifying all of the SDDF gaps and how they are to be processed. A "hunk" may be marked as (1) internal to a dataset; or (2) available for immediate processing; or (3) must be processed via temporary dataset method. Hunks internal to user datasets cannot be reclaimed. I/O operations to allocated datasets may not be halted, so the SDDF session may be updated indicating that these tracks are not available for reclaim. Hunks that are available for immediate processing are then processed (while still holding the SYSVTOC RESERVE). If the hold timer expires, we will terminate this pass and begin the next pass.

Subsequently, processing the hunks that must be processed via the temporary dataset method is performed. The temporary dataset method may not be used for offline devices, and may not be used when reclaim processing is run as a subtask of SCF. For these situations, all reclaim processing may take place while holding the SYSVTOC RESERVE. A temporary dataset is allocated to the first subset (e.g., 10) of these hunks. Then the SYSVTOC RESERVE is release. Now processing of the hunks can occur without holding the SYSVTOC RESERVE because the space is allocated for our use. Each hunk is then processed and the SDDF session information is updated. As processing of a dataset completed, the dataset is scratched and processing continues with the next dataset. In an embodiment, the size of each dataset may be limited. For example, each dataset may be limited to: (1) 1000 cylinders or (2) 21,000 cylinders if in an extended address volume (EAV) cylinder managed space. The size factors may be changed via an SCF initialization parameters.

The bottom of the normal processing pass is releasing the SYSVTOC RESERVE and waiting a while (for other activity to catch up) before starting the next pass. The list of free space to be reclaimed by the temporary dataset method is continued to be processed while not holding the SYSVTOC RESERVE. An attempt may be made to allocate each hunk (without holding the SYSVTOC RESERVE). If successful, that hunk may be processed. If allocation fails, the allocation process may be retried the next pass while holding the SYSVTOC RESERVE. The first time through, it is possible that only a small amount of reclaim work occurred. This would be because of the limited time due to the SYSVTOC RESERVE hold timer. But, as more passes complete, more of the work that has to be done within the SYSVTOC RESERVE is accomplished and eventually all of the work is being done using the temporary dataset method. This minimizes the amount of time the SYSVTOC RESERVE is held, long enough to allocate the datasets for the next pass.

In an embodiment, the reclaim utility may allocate and process the free space in hunks rather than allocating and processing all of the free space to datasets. This processing allows a certain amount of space to be reclaimed and still leaves space available for other use. If new datasets are allocated, it is detected in the next pass and no longer needs to be processed.

In an embodiment, the scan utility may accept three parameters, first is the scan operation command, second is a device identifier and third is a keyword "DEBUG". The device may be online or offline. The device may have a VTOC Index. The device may be channel attached and have the identifier available. The utility maybe run in an LPAR with SCF active, and the Zero Reclaim environment may be active in SCF. Finally, the device may be a thin device, particularly a CKD thin device, that is being monitored by the SCF subtask and may have an SDDF session. Processing of the scan utility may begin by obtaining the SYSVTOC RESERVE on the device. Next the VTOC free space information is obtained. Then each entry in the free space list is applied to the SDDF session. Finally, the SYSVTOC RESERVE is released.

In an embodiment, a Bind/Unbind utility (e.g., a RPB GPM Batch utility) may be updated to help manage the SDDF sessions. When an UNBIND is requested, a check will be made for the reserved SDDF session. If found, it will be closed (terminated). When a BIND is requested, processing depends on whether PERSIST is requested. If PERSIST is requested, no SDDF session will be created. But the SCF subtask may be notified in order to ensure that its tables are correct. If PERSIST is not requested, a new reserved SDDF session may be created and the SCF Subtask may be notified in order to ensure that its tables are correct. When PERSIST is being added, any existing reserved SDDF session will be terminated and the SCF subtask may be notified. When PERSIST is being removed, a new SDDF session may be created and the SCF subtask may be notified.

In an embodiment, it is noted that the system described herein may be used in connection with snap copying and/or cloning systems. After a full device clone to a thin device occurs, the SCF subtask may be notified. The SCF subtask may schedule processing of the scan and/or reclaim utilities in order to reclaim all free space on the device. An example of a snap copying/cloning system is an EMC product, EMC SNAP, that may be used in connection with TF/Clone or FlashCopy as a data mover.

The scratch exit task may be run on all LPARs attached to the Symmetrix in order to capture and record the scratch activity. If it is not running on an LPAR that is scratching datasets on thin devices, the space may not be automatically reclaimed by this implementation. At any point in time, it is possible for the zOS VTOC free space map, the SDDF session information, and the Symmetrix thin device allocation map to all reflect different information. This in inherent in the implementation. In a quiesced, steady state, the above should show very much the same, if not identical, information. The zOS VTOC free space map is the known allocation of space, but it does not indicate which tracks have been written to, simply which tracks are allocated. The SDDF session may only reflect tracks that have not been processed by the SCF subtask. Depending on user options, there may always be some tracks not processed. The Symmetrix thin device allocation map may show which tracks have been written to, and has no knowledge of which tracks have been allocated and unused.

FIG. 17 is flow diagram 1000 showing reclaim processing according to an embodiment of the system described herein for marking, detecting and reclaiming tracks in a virtual provisioning system. It is noted that the reclaim processing may be scheduled and/or performed automatically. At a step 1002, a device, such as a CKD device, is scanned to identify what is to be reclaimed. In an embodiment, the scan may be performed by running a scan utility which may include performance of a scratch exit task may identify tracks of the device that are suitable to be reclaimed. The scratch exit task may include examination of the SDDF session information and/or the VTOC maps concerning allocated track, among other information and tables of the storage system, as further discussed elsewhere herein. It is also noted that the scan of the step 1002 may follow initialization processing involving an initial state of the SDDF session, as further discussed elsewhere herein.

After the step 1002, processing proceeds to a step 1004, where the tracks to be reclaimed are marked (or scratched), which may be performed using the reclaim utility and/or, in some cases, by the scan utility depending on the amount of data of the indicated tracks. The scratch exit processing may include checking tracks identified in the SDDF session against the actual VTOC free space and then scratching the contents to indicate the tracks as candidates for reclaiming according to the system described herein. After the step 1004, processing proceeds to a step 1006 where a track to be reclaimed and placed into the free track pool is detected and/or otherwise identified in connection with notifying the storage system that reclamation is to occur of a particular track.

After the step 1006, processing proceeds to a test step 1008 where it is determined whether the particular track detected and marked as a candidate for reclaiming is to be reclaimed. As discussed herein, attributes assigned to a thin device may indicate that one or more tracks otherwise suitable to be reclaimed are not to be reclaimed. If at the test step 1008 it is determined that the track is not to be reclaimed, then processing proceeds to a test step 1012, as discussed below. If, however, at the test step 1008, it is determined that the particular track, as marked and detected, is to be reclaimed, then processing proceeds to a step 1010 where the track is reclaimed by returning the track to the free track pool according to the reclaim processing discussed in detail elsewhere herein. It is noted that is some embodiments, the processing of the step 1010 may be performed as a background task. After the step 1010, processing proceeds to a test step 1012 where it is determined whether there are other tracks that have been identified as candidates for reclaiming. If not, then processing is complete. Otherwise, if other tracks are to be reclaimed, processing proceeds back to the step 1006.

In another embodiment, it is noted that there may be a time element involved between when a dataset is scratched and the space is reclaimed. Because there is an I/O involved for each track being reclaimed, this may have an impact on device activity, channel activity and/or CPU activity. According to the system described herein, the time element may be controlled between when a dataset is scratched in zOS and those tracks are reclaimed in the Symmetrix. In particular, if the interval is too short, thrashing can occur, and, if the interval is too long, valuable space in the pool may be tied up and a shortage could occur.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible and/or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for performing reclaim processing of a storage system with virtually provisioned devices, comprising:
   identifying at least one track corresponding to a virtually provisioned device of the storage system that is a candidate for reclaiming, wherein the at least one track is virtually provisioned to the virtually provisioned device but for which no requirement exists that the at least one track is backed by physical storage of the storage system;
   marking the at least one track, as a marked track, wherein the marked track is marked using at least one bit that is independent of any current data content corresponding to the marked track, and wherein setting of the at least one bit does not reflect whether the marked track is backed by physical storage;
   detecting the marked track; and
   reclaiming the marked track to a free track pool of the storage system.

2. The method according to claim 1, wherein identifying the at least one track includes executing a session for one or more of the virtually provisioned devices that scans the one or more virtually provisioned devices and monitors changes in data on the one or more virtually provisioned devices.

3. The method according to claim 2, wherein the session maintains a map having at least one bit for each track of the one or more of the virtually provisioned devices that identifies the tracks as candidates for reclaiming.

4. The method according to claim 1, wherein marking the at least one track includes performing a track erase command on the at least one track that marks the track as erased.

5. The method according to claim 4, wherein the marked track that is marked as erased includes a record zero written to the at least one bit.

6. The method according to claim 1, further comprising:
   scheduling the reclaim processing using at least one utility.

7. The method according to claim 6, wherein the scheduling includes automatically scheduling the performing of the reclaim processing as a background task.

8. The method according to claim 1, wherein the virtually provisioned device includes a count key data device.

9. A non-transitory computer readable medium storing software for performing reclaim processing of a storage system with virtually provisioned devices, the software comprising:
- executable code that identifies at least one track corresponding to a virtually provisioned device of the storage system that is a candidate for reclaiming, wherein the at least one track is virtually provisioned to the virtually provisioned device but for which no requirement exists that the at least one track is backed by physical storage of the storage system;
- executable code that marks the at least one track, as a marked track, wherein the marked track is marked using at least one bit that is independent of any current data content corresponding to the marked track, and wherein setting of the at least one bit does not reflect whether the marked track is backed by physical storage;
- executable code that detects the marked track; and
- executable code that reclaims the marked track to a free track pool of the storage system.

10. The non-transitory computer readable medium according to claim 9, wherein the executable code that identifies the at least one track includes executable code that executes a session for one or more of the virtually provisioned devices and executable code that scans the one or more virtually provisioned devices and monitors changes in data on the one or more virtually provisioned devices.

11. The non-transitory computer readable medium according to claim 10, wherein the executable code that executes the session includes executable code that maintains a map having at least one bit for each track of the one or more of the virtually provisioned devices that identifies the tracks as candidates for reclaiming.

12. The non-transitory computer readable medium according to claim 9, wherein the executable code that marks the at least one track includes executable code that performs a track erase command on the at least one track that marks the track as erased.

13. The non-transitory computer readable medium according to claim 12, wherein the marked track that is marked as erased includes a record zero written to the at least one bit.

14. The non-transitory computer readable medium according to claim 9, further comprising:
- executable code that schedules the reclaim processing using at least one utility.

15. The non-transitory computer readable medium according to claim 14, wherein the scheduling includes automatically scheduling the performing of the reclaim processing as a background task.

16. The non-transitory computer readable medium according to claim 9, wherein the virtually provisioned device includes a count key data device.

17. A system for performing reclaim processing, comprising:
- at least one virtually provisioned device of a storage system;
- at least one utility that performs reclaim processing on the at least one virtually provisioned device, the at least one utility including software stored on a non-transitory computer readable medium storing software, the software comprising:
  - executable code that identifies at least one track corresponding to a virtually provisioned device of the storage system that is a candidate for reclaiming, wherein the at least one track is virtually provisioned to the virtually provisioned device but for which no requirement exists that the at least one track is backed by physical storage of the storage system;
  - executable code that marks the at least one track, as a marked track, wherein the marked track is marked using at least one bit that is independent of any current data content corresponding to the marked track, and wherein setting of the at least one bit does not reflect whether the marked track is backed by physical storage;
  - executable code that detects the marked track; and
  - executable code that reclaims the marked track to a free track pool of the storage system.

18. The system according to claim 17, wherein the executable code that identifies the at least one track includes executable code that executes a session for one or more of the virtually provisioned devices and executable code that scans the one or more virtually provisioned devices and monitors changes in data on the one or more virtually provisioned devices, wherein the executable code that executes the session maintains a map having at least one bit for each track of the one or more of the virtually provisioned devices that identifies the tracks as candidates for reclaiming, and wherein the executable code that marks the at least one track includes executable code that performs a track erase command on the at least one track that marks the track as erased.

19. The system according to claim 17, further comprising:
- executable code that schedules the reclaim processing using the at least one utility.

20. The system according to claim 17, wherein the at least one virtually provisioned device includes a count key data device.

* * * * *